United States Patent
Tomita et al.

(10) Patent No.: US 9,968,176 B2
(45) Date of Patent: May 15, 2018

(54) IMAGE PROCESSING METHOD AND IMAGE PROCESSING DEVICE

(71) Applicant: Panasonic Intellectual Property Management Co., Ltd., Osaka (JP)

(72) Inventors: Hiroto Tomita, Fukuoka (JP); Phu Nguyen, Fukuoka (JP); Tadanori Tezuka, Fukuoka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 232 days.

(21) Appl. No.: 14/784,743

(22) PCT Filed: Apr. 16, 2014

(86) PCT No.: PCT/JP2014/002170
§ 371 (c)(1),
(2) Date: Oct. 15, 2015

(87) PCT Pub. No.: WO2014/171142
PCT Pub. Date: Oct. 23, 2014

(65) Prior Publication Data
US 2016/0058158 A1    Mar. 3, 2016

(30) Foreign Application Priority Data

Apr. 17, 2013  (JP) ................................. 2013-086341

(51) Int. Cl.
*A45D 44/00* (2006.01)
*H04N 5/232* (2006.01)
(Continued)

(52) U.S. Cl.
CPC ......... *A45D 44/005* (2013.01); *G06F 3/0416* (2013.01); *G06K 9/00604* (2013.01);
(Continued)

(58) Field of Classification Search
CPC ............ A45D 44/005; H04N 5/23219; H04N 5/23222; H04N 5/23229;
(Continued)

(56) References Cited

U.S. PATENT DOCUMENTS

| 4,539,585 A | 9/1985 | Spackova et al. |
| 6,449,019 B1 | 9/2002 | Fincher et al. |

(Continued)

FOREIGN PATENT DOCUMENTS

| CN | 101371272 | 2/2009 |
| CN | 101779218 | 7/2010 |

(Continued)

OTHER PUBLICATIONS

International Search Report dated May 27, 2014 in corresponding International Application No. PCT/JP2014/002170.
(Continued)

*Primary Examiner* — Joseph Suh
(74) *Attorney, Agent, or Firm* — Wenderoth, Lind & Ponack, L.L.P.

(57) ABSTRACT

An image processing method including: determining whether an operation mode of a system is a control mode for still image display or a view mode for video display; and performing processing in accordance with the operation mode. Processing in the control mode includes: specifying a specific video frame image including a suitable image of a subject of image processing, from among video frame images of a video constituted of a plurality of video frame images each including an image of the subject; displaying the specific video frame image as a still image; and receiving control related to image processing from a user. Processing in the view mode includes: performing image processing with respect to each video frame image that is input, one
(Continued)

video frame image at a time; and displaying the result of image processing for the user to view.

21 Claims, 18 Drawing Sheets

(51) Int. Cl.
*G06T 11/00* (2006.01)
*G06F 3/041* (2006.01)
*G06K 9/00* (2006.01)
*H04N 5/272* (2006.01)

(52) U.S. Cl.
CPC ......... *G06T 11/00* (2013.01); *H04N 5/23219* (2013.01); *H04N 5/23222* (2013.01); *H04N 5/23229* (2013.01); *G06T 2207/30201* (2013.01); *H04N 2005/2726* (2013.01)

(58) Field of Classification Search
CPC .......... H04N 2005/2726; G06F 3/0416; G06K 9/00604; G06T 11/00; G06T 2207/30201
See application file for complete search history.

(56) References Cited

U.S. PATENT DOCUMENTS

| | | | |
|---|---|---|---|
| 2001/0053292 A1* | 12/2001 | Nakamura | G06F 17/30247 396/661 |
| 2002/0079466 A1* | 6/2002 | Talmi | G01D 5/347 250/559.1 |
| 2006/0001690 A1* | 1/2006 | Martinez | B41J 29/393 347/19 |
| 2006/0084874 A1* | 4/2006 | Imamura | A61B 8/06 600/447 |
| 2006/0176311 A1* | 8/2006 | Kimoto | H04N 9/3182 345/589 |
| 2007/0019882 A1* | 1/2007 | Tanaka | G06T 17/20 382/276 |
| 2007/0189627 A1* | 8/2007 | Cohen | G06K 9/00228 382/254 |
| 2007/0194858 A1* | 8/2007 | Song | G11B 27/034 333/2 |
| 2008/0024389 A1* | 1/2008 | O'Brien-Strain | H04N 9/3194 345/1.2 |
| 2009/0087114 A1* | 4/2009 | Porter | H04N 19/139 382/252 |
| 2010/0226531 A1* | 9/2010 | Goto | G06T 11/00 382/103 |
| 2011/0273479 A1* | 11/2011 | Ingrassia, Jr. | G06F 3/04883 345/666 |
| 2011/0304607 A1* | 12/2011 | Ito | G06T 11/60 345/419 |
| 2012/0044335 A1 | 2/2012 | Goto | |
| 2012/0155726 A1* | 6/2012 | Li | A61B 3/1173 382/128 |
| 2012/0176401 A1* | 7/2012 | Hayward | G06T 3/0093 345/619 |
| 2012/0201460 A1* | 8/2012 | Seo | G06T 7/11 382/180 |
| 2013/0057763 A1* | 3/2013 | Cha | G09G 5/006 348/554 |
| 2013/0140467 A1* | 6/2013 | Kitano | H01L 27/14663 250/393 |
| 2013/0243153 A1* | 9/2013 | Sra | A61B 6/022 378/41 |
| 2013/0258118 A1* | 10/2013 | Felt | A45D 44/005 348/207.1 |
| 2014/0002380 A1* | 1/2014 | Li | G06F 3/04883 345/173 |
| 2014/0140577 A1* | 5/2014 | Hanita | G06K 9/00228 382/103 |
| 2014/0153832 A1* | 6/2014 | Kwatra | G06T 11/00 382/195 |
| 2014/0282647 A1* | 9/2014 | Hardy | H04N 21/44218 725/12 |
| 2014/0328509 A1* | 11/2014 | Guissin | G06T 5/002 382/100 |
| 2015/0212694 A1* | 7/2015 | Ho | G06F 3/04842 715/800 |

FOREIGN PATENT DOCUMENTS

| | | |
|---|---|---|
| CN | 102982759 | 3/2013 |
| JP | 2001-357404 | 12/2001 |
| JP | 2004-94917 | 3/2004 |
| JP | 2005-216131 | 8/2005 |
| JP | 2006-313223 | 11/2006 |
| JP | 2007-49371 | 2/2007 |
| JP | 2007-216000 | 8/2007 |
| JP | 3984191 | 10/2007 |
| JP | 2011-259243 | 12/2011 |
| JP | 5191665 | 5/2013 |

OTHER PUBLICATIONS

Extended European Search Report dated Mar. 17, 2016 in corresponding European Application No. 14785844.3.
Agarwala A. et al.: "Keyframe-Based Tracking for Rotoscoping and Animation", ACM Transactions on Graphics (TOG), ACM, US, vol. 23, No. 3, Aug. 1, 2004 (Aug. 1, 2004), pp. 584-591, XP002468600.
Office Action dated Dec. 5, 2017 in corresponding Chinese Application No. 201480013933.2 (with English translation of Search Report).

* cited by examiner

FIG. 16A
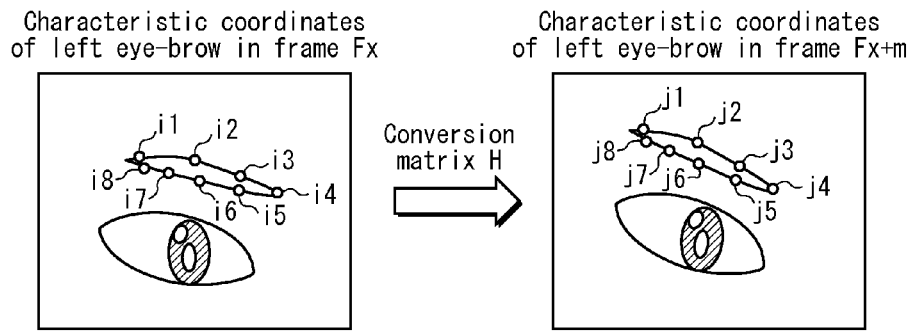
FIG. 16B
$$\begin{bmatrix} j1 \\ j2 \\ j3 \\ j4 \\ \cdot \\ \cdot \\ \cdot \\ j8 \end{bmatrix} = H \begin{bmatrix} i1 \\ i2 \\ i3 \\ i4 \\ \cdot \\ \cdot \\ \cdot \\ i8 \end{bmatrix}$$ ← Calculate conversion matrix H satisfying relationship on left, and map hand-drawn image drawn on frame Fx onto frame Fx+m
FIG. 16C
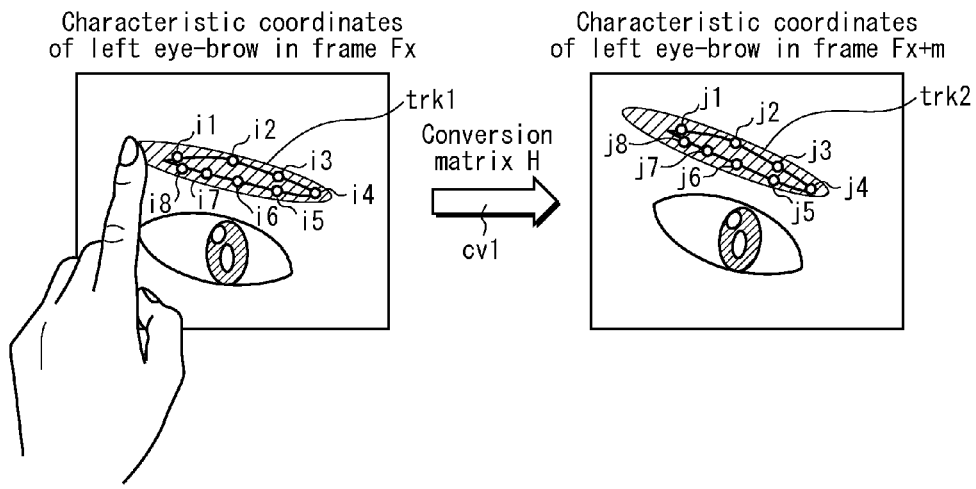

IMAGE PROCESSING METHOD AND IMAGE PROCESSING DEVICE

TECHNICAL FIELD

The present invention relates to an image processing method involving image recognition and image processing, and a device related to the image processing method.

BACKGROUND ART

There exists conventional technology known as make-up simulation. Make-up simulation involves executing make-up processing with respect to a face image through image processing by using a computer, and thereby virtually simulating a make-up applied face. Make-up simulation involves extracting characteristic coordinates (for example, coordinates corresponding to the mouth, an eye, the nose, and the outline of the face) from the face image by applying recognition technology with respect to the face image, and compositing virtual cosmetic items (one example of which is a lipstick) with the face image through image processing based on the characteristic coordinates. In particular, displaying simulation results in real-time on a video showing a user's face achieves realistic make-up simulation allowing the user to feel as though he/she is actually wearing make-up in front of a mirror (see Patent Literature 1 and Patent Literature 2, for example). Typically, a system for such make-up simulation includes a monitor viewable from the user, and a camera for producing images of the user's face. In such a system, the camera is typically located on top of the monitor or at a similar location.

CITATION LIST

Patent Literature

[Patent Literature 1]
  Japanese Patent Publication No. 5191665
[Patent Literature 2]
  Japanese Patent Publication No. 3984191
[Patent Literature 3]
  Japanese Patent Application Publication No. 2007-49371

SUMMARY OF INVENTION

Technical Problem

Here, it should be noted that the user of such a system, when performing make-up simulation, needs to operate a control panel for controlling the virtual cosmetic items while concentrating his/her attention on the image of his/her face shown on the monitor. Due to this, there are cases where the user's face does not directly face the camera, which results in lower detection accuracy of characteristic coordinates compared to when the user's face is directly facing the camera. This further results in low quality make-up simulation results. Further, a motion that the user makes is reflected in the face image shown on the monitor with latency, due to computation required for the make-up simulation. As a result, the user feels difficulty in performing control related to make-up simulation while user motion is being detected.

The present invention solves such conventional technical problems, and aims to provide an image processing method in which a suitable image is selected as an image for receiving on-screen control.

Solution to Problems

In order to solve the conventional technical problems described above, one aspect of the present disclosure is an image processing method usable in an image processing system. The image processing system performs image processing with respect to a video input thereto and displays a result of the image processing. The image processing method includes: determining whether an operation mode of the system is a control mode or a view mode, the system performing still image display in the control mode and performing video display in the view mode; and performing processing in accordance with the operation mode. When the system is in the control mode, the processing in accordance with the operation mode includes: specifying a specific video frame image from among a plurality of video frame images of a video constituted of a plurality of video frame images each including an image of a subject of the image processing, the specific video frame image being a video frame image in which the image of the subject is suitable; displaying the specific video frame image as a still image; and receiving control related to the image processing from a user, via the image of the subject in the specific video frame image, and when the system is in the view mode, the processing in accordance with the operation mode includes: performing the image processing with respect to each video frame image that is input, one video frame image at a time; and displaying the result of the image processing for the user to view.

Advantageous Effects of Invention

In the image processing method pertaining to one aspect of the present disclosure, a suitable image is selected as an image for receiving on-screen control. In particular, the selected image is a still image including a suitable image of the subject of image processing.

BRIEF DESCRIPTION OF DRAWINGS

FIG. 16A illustrates a plurality of characteristic coordinates present in frame image Fx and a plurality of characteristic coordinates present in frame image Fx+m, FIG. 16B illustrates one example of a conversion matrix, and FIG. 16C illustrates a situation where a hand drawing image is composited with a still image.

EMBODIMENTS

<Results of Consideration by Inventors>

Figure 1:
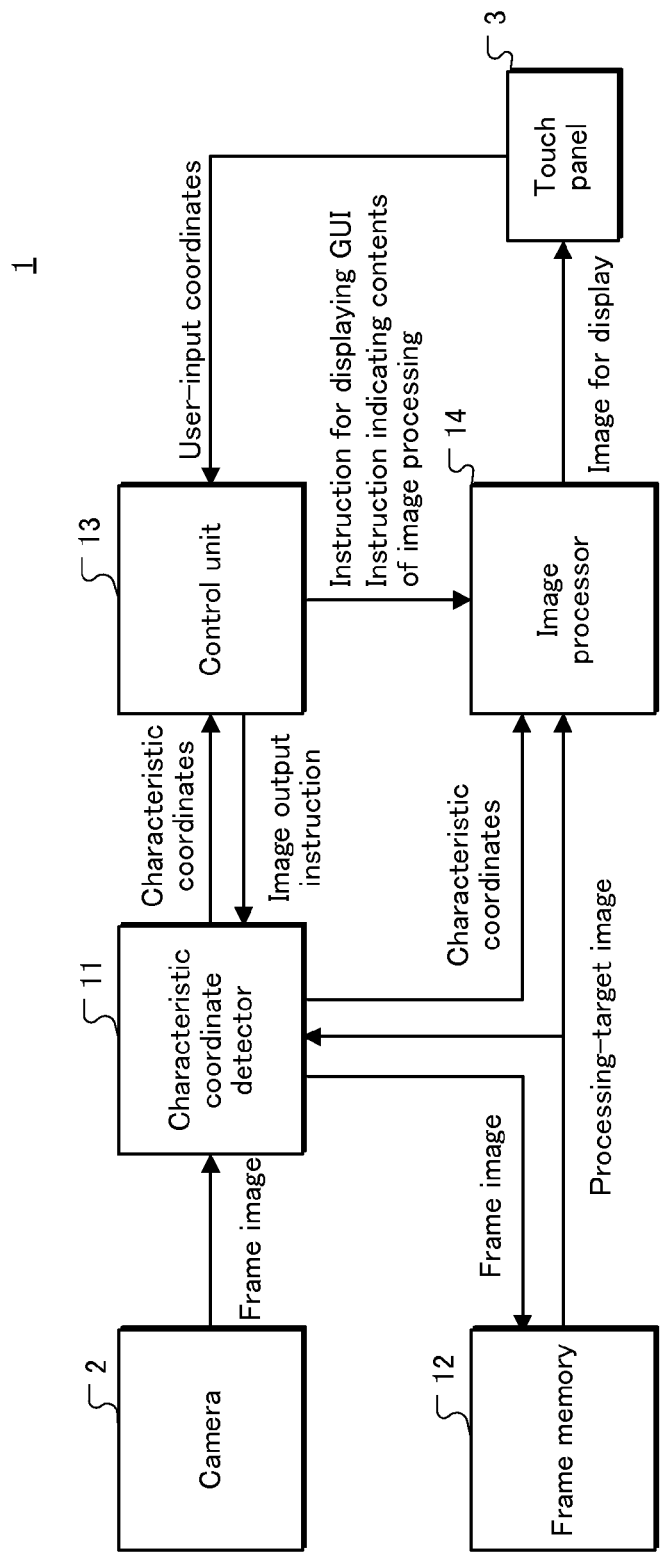
FIG. 1 illustrates functional blocks of a make-up simulator in embodiment 1.

A make-up simulator performing real-time processing produces an image of a user by using a camera facing the user, and displays the image of the user on a monitor after performing image processing on the image. Meanwhile, in performing make-up simulation by using such a make-up simulator, the user needs to control, for example, a touch panel integrated with the monitor or a control panel that is separate from the monitor, in order to perform control for selecting a virtual cosmetic item (e.g., a lipstick, a blusher, or a mascara) and applying the selected virtual cosmetic item with respect to his/her face displayed on the monitor. Accordingly, during such control, the user's face, eyes, etc., are oriented towards the monitor, the control panel, or the like, and thus the make-up simulator is not capable of obtaining an image in which the user is directly facing the camera. Here, it should be noted that the accuracy with which characteristic coordinates are detected is lower for such an image (i.e., an image in which the user's face, eyes, etc., do not directly face the camera) compared to for an image in which the user's face, eyes, etc., directly face the camera. This results in incorrect detection of characteristic coordinates, which further results in the selected virtual cosmetic item being applied with respect to unintended positions. This further results in low quality make-up simulation results.

In addition, latency due to hardware processing ability constraints may arise in real-time processing. Specifically, since processing is performed with respect to one video frame at a time, latency of at least one frame occurs in make-up processing. Further, due to make-up processing including other processing, namely characteristic coordinate detection, virtual cosmetic part transformation, and image compositing, latency of 0.1 seconds or longer may occur in some cases. In the presence of such latency, it is difficult for the user to touch a position of his/her image displayed on the monitor that he/she would like to touch. This is since a user image currently displayed on the monitor shows a motion that the user has made in the past, and thus the user attempting to perform touch control with respect to the user image feels that the user image is moving in an unexpected manner.

One possible solution to such problems would be to display a still image while the user is performing control such as make-up related control. In connection with this, Patent Literature 3 discloses one example of a method enabling switching between video display and still image display. Specifically, Patent Literature 3 discloses switching from video display to still image display when the user performs image capture control.

A still image suitable for display while the user is performing make-up related control is a still image in which the user is facing forward and the user's eyes are looking directly towards the camera. Such an image is suitable since characteristic coordinates can be easily detected from such an image, and also, since the user would be able to perform make-up related control with ease based on such an image. However, an image produced when the user performing image capture control does not necessarily qualify as such a suitable image. This is since when the user performs such control, for example, the user's face, eyes, etc., may be facing the control panel, and/or the user may be in an inappropriate posture.

In view of the above, the present inventors have arrived at the idea of starting capturing of a video once the user performs control for switching from video display to still image display, and to continue the capturing of the video until a still image for receiving make-up related control by the user is specified. The still image for receiving make-up related control by the user is specified by detecting characteristic coordinates in each frame of the video being captured, until an image suitable for receiving the make-up related control by the user is acquired. This configuration allows the user to perform make-up simulation based on an image suitable for receiving the make-up related control by the user. In particular, the image for receiving make-up related control is not necessarily an image captured immediately after the user performs image capture control.

<Embodiments>

The following describes embodiments of the present disclosure, with reference to the accompanying drawings.

<Embodiment 1>

<Structure>

FIG. 1 illustrates functional blocks of a make-up simulator 1 pertaining to the present embodiment. The make-up simulator 1 includes: a camera 2; a characteristic coordinate detector 11; a frame memory 12; a control unit 13; an image processor 14; and a touch panel-type monitor 3.

The camera 2 includes: an image capture optical system (undepicted); an image capture element (undepicted); and an A/D converter circuit (undepicted). The image capture optical system includes a focus lens for focus control, and an exposure control unit composed of a shutter and an aperture. The image capture optical system may additionally include a zoom lens for zooming. The image capture element is a photoelectric conversion element implemented by using a CCD sensor or a CMOS sensor. The image capture element creates and outputs an image signal by using an image of an image capture subject created by the image capture optical system. The A/D conversion circuit is a converter converting the image signal (analog signal) output from the image capture element into a digital signal. The digital data output from the A/D conversion circuit is output from the camera 2 in the form of a captured image. The camera 2 outputs frame images constituting a digital video, one frame image at a time, to the characteristic coordinate detector 11.

The characteristic coordinate detector 11 first performs face detection with respect to a frame image output from the camera 2. Then, the characteristic coordinate detector 11 detects face outlines, including the outline of an eye, the outline of the nose, the outline of the mouth, and the outline of the face, in the frame image, and outputs characteristic coordinates indicating the positions of such outlines to the control unit 13 and the image processor 14. Note that the characteristic coordinate detector 11 performs the above-described processing with respect to each frame image constituting the video output from the camera 2. In specific, with respect to digital data corresponding to a given frame constituting the video, the characteristic coordinate detector 11 first converts the frame into an image having a size of M pixels in the vertical direction and N pixels in the horizontal direction. Subsequently, the characteristic coordinate detector 11 first detects a face region in the frame based on face parts appearing in the frame (e.g., the eyes, the nose, the mouth, the face outline, hair, etc.), based on methods such as those disclosed in Patent Literature 1 and Patent Literature 2. Then, the characteristic coordinate detector 11 detects characteristic coordinates corresponding to each face part (e.g., an eye, the nose, the mouth, the face outline, etc.). The characteristic coordinate detector 11 outputs the characteristic coordinates so detected to the control unit 13.

In addition, the characteristic coordinate detector 11, each time receiving an image output instruction from the control unit 13, transfers a frame image constituting the video output from the camera 2 to the frame memory 12.

The frame memory 12, each time receiving a frame image output from the characteristic coordinate detector 11, holds the frame image. Note that in the present disclosure, processing is performed with respect to the frame image currently held by the frame memory 12. The frame memory 12 outputs the frame image therein to the image processor 14. For example, the frame memory 12 is implemented by using a storage device such as a semiconductor memory device (e.g., a DRAM or a flash memory) or a magnetic storage device (e.g., a HDD).

The control unit 13 manages an operation mode of the make-up simulator 1. Further, the control unit 13 receives, from a user of the make-up simulator 1, specifics of image processing desired by the user, and holds the specifics. In specific, the control unit 13 keeps track of whether the current operation mode of the make-up simulator 1 is a view mode or a control mode. Further, the control unit 13 receives, from the user, an instruction to switch the operation mode from one mode to the other. In addition, the control unit 13, when the current operation mode is the control mode, keeps track of whether the still image for receiving make-up related control by the user has already been specified. When the still image for receiving make-up related control by the user has not been specified yet, the control unit 13 determines whether the frame image that is currently being processed is suitable as the still image for receiving make-up related control by the user, based on the characteristic coordinates output from the characteristic coordinate detector 11. Further, when the current operation mode is the control mode and the frame image that is currently being processed is suitable as the still image for receiving make-up related control by the user, the control unit 13 receives input for the make-up related control from the user, and causes image processing based on such input to be executed with respect to each frame image following the frame image specified as the still image for receiving make-up related control by the user.

The image processor 14 performs image processing with respect to the frame image currently held by the frame memory 12, and outputs the result of the image processing to the touch panel monitor 3. The image processor 14 performs the image processing by using an image processing instruction output by the control unit 13 and characteristic coordinates output from the characteristic coordinate detector 11.

The touch panel monitor 3 is a display device that is implemented by using an LCD (liquid crystal display), a PDP (plasma display panel), an organic EL panel, or the like, and that also serves as a position input device performing position detection by utilizing a touch sensor of the electrostatic capacitive type, the infrared type, or the like. The touch panel monitor 3 displays images output from the image processor 14. Further, when the user performs input via the touch sensor, the touch panel monitor 3 transmits coordinates indicating the position of input to the control unit 13.

Note that the characteristic coordinate detector 11, the control unit 13, and the image processor 14 are each implemented by using, for example, a combination of software and a programmable device such as a processor, or by using hardware such as a field programmable gate array (FPGA) or an application specific integrated circuit (ASIC).

<Overview>

The following provides an overview of the external appearance and the operations of the make-up simulator 1.

Figure 2:
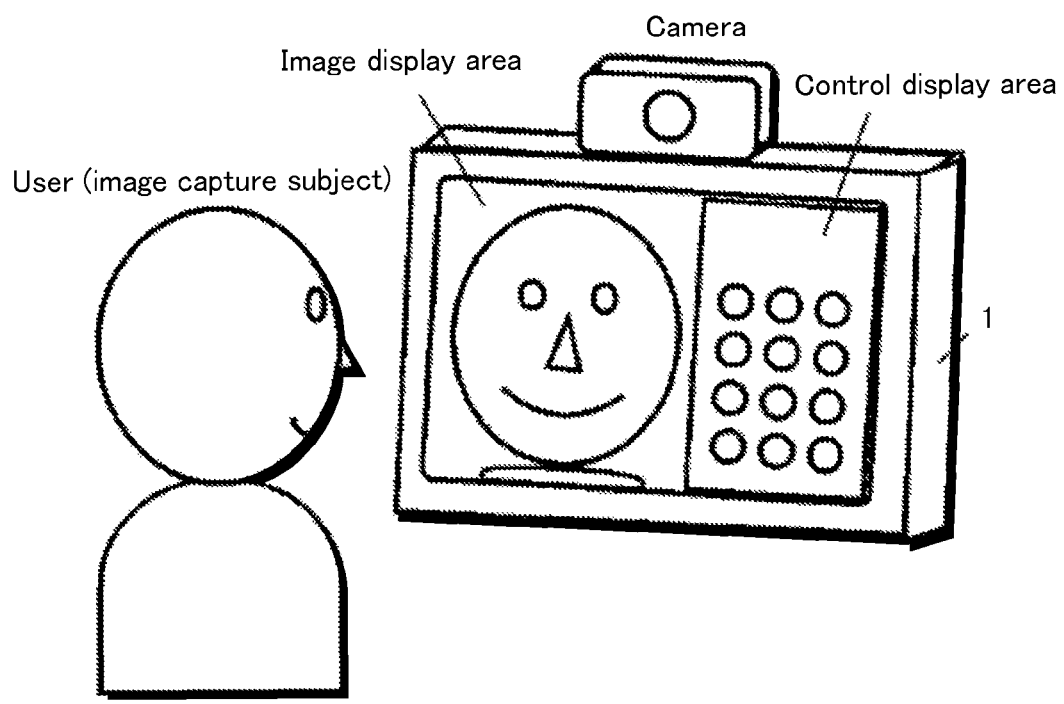
FIG. 2 illustrates the external appearance of the make-up simulator in embodiment 1.

FIG. 2 illustrates the external appearance of the make-up simulator 1. The user takes a position in front of the make-up simulator 1, and causes the camera 2, which is located above the touch panel monitor 3, to capture images of himself/herself.

FIG. 2 also illustrates an image being displayed on the touch panel monitor 3. The touch panel monitor 3 has two separate display areas each displaying different contents. One is an image display area displaying a result of image processing performed with respect to a user image captured by the camera 2. The other is a control display area displaying guidance enabling the user to perform control and receiving the control performed by the user via the touch sensor.

As already discussed above, the make-up simulator 1 has two operation modes, namely the view mode and the control mode. When in the view mode, the make-up simulator 1 displays a video in the image display area in real-time. The displayed video is yielded by performing image processing with respect to user images captured by the camera 2. This results in image-processed images, or in other words, simulation results being displayed for the user to view, right in front of the user. Thus, when in the view mode, the make-up simulator 1 serves as a digital mirror having a make-up simulation function, and therefore, the user is able to check his/her face with make-up simulation applied as if looking at his/her face in a mirror. Meanwhile, when in the control mode, the make-up simulator 1 receives make-up related control via the touch sensor of the touch panel monitor 3. The make-up related control is for selecting virtual cosmetic items (lipsticks, blushers, etc.) displayed in the control display area, and for controlling/selecting color, application shape, application position, etc., of the selected virtual cosmetic items. Here, the user may perform specification of the application shape, the application position, etc., of the selected virtual cosmetic items on the user image displayed in the image display area. Information regarding the control/selection performed by the user is input to the control unit 13 via the touch panel monitor 3. The control unit 13, when receiving such information, instructs the image processor 14 to change the specifics of image processing based on the information. Thus, the make-up simulator 1 immediately changes the virtual make-up applied to the user image displayed in the image display area in accordance with the information regarding the control/selection performed by the user. Therefore, the user is able to check the results of make-up simulation immediately, which allows the user to carry out make-up simulation without any hesitation.

<Mode Switching>

Figure 3:
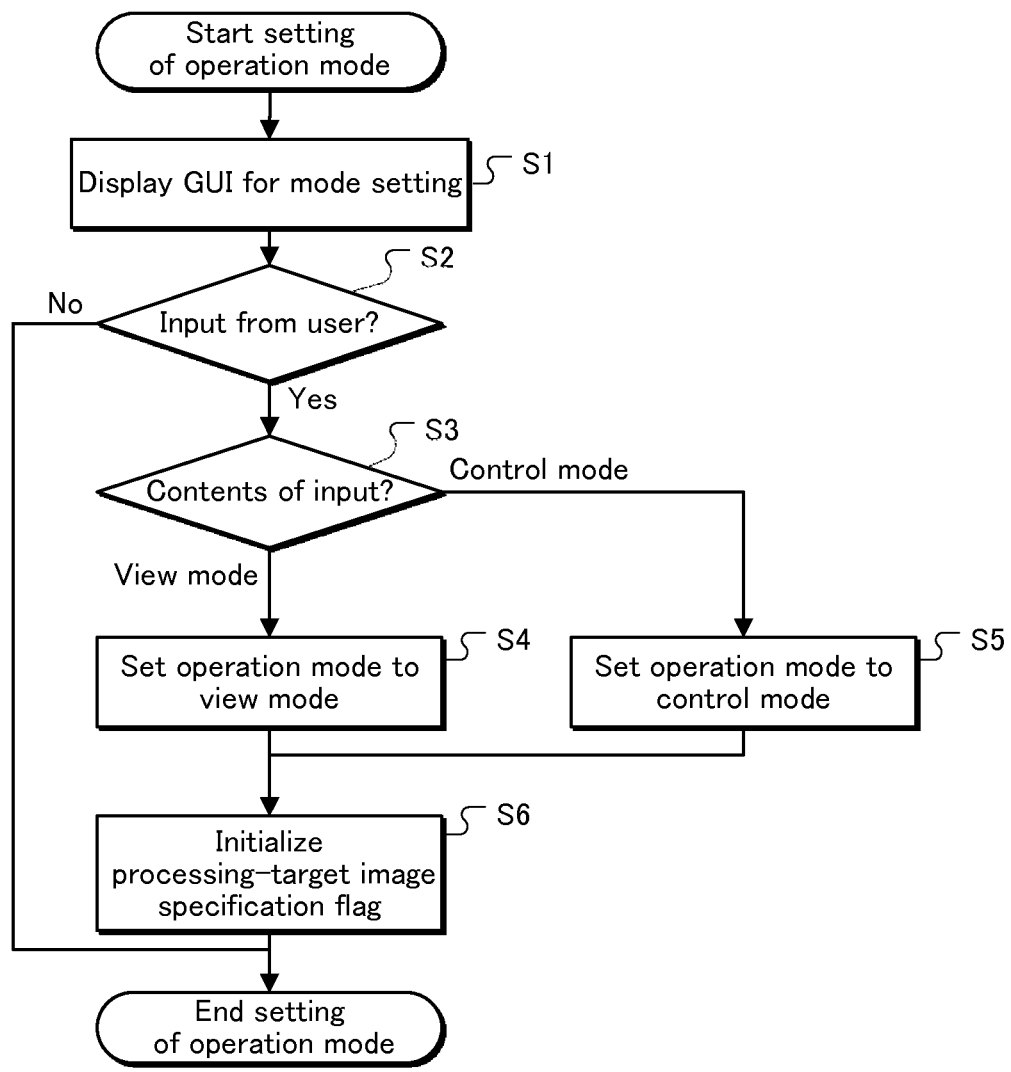
FIG. 3 is a flowchart illustrating procedures for setting an operation mode of the make-up simulator in embodiment 1.

The following describes operations for setting the operation mode of the make-up simulator 1, with reference to FIG. 3.

The make-up simulator 1 displays, in the control display area of the touch panel monitor 3, a graphical user interface (GUI) allowing the user to set the operation mode (S1). The GUI displayed is, for example, a combination of a playback icon indicating the view mode and a pause icon indicating the control mode. The make-up simulator 1 commences the operation in Step S1 when the user issues an instruction, for example, by touching a mode switching icon displayed on the touch panel monitor 3.

Subsequently, the make-up simulator 1 checks whether or not the user has performed input for selecting the operation mode via the control display area of the touch panel monitor 3. Here, the make-up simulator 1 may confirm the specifics of the user instruction with the user by, for example, displaying an icon selected by the user in inverted color or emphasizing the frame of the icon selected by the user.

When the input received via the touch panel monitor 3 is for selecting the view mode (View mode in S3), the make-up simulator 1 sets the view mode as the operation mode thereof (S4). In specific, the make-up simulator 1 writes information indicating that the operation mode thereof is the view mode to an operation mode register of the control unit 13.

Meanwhile, when the input received via the touch panel monitor 3 is for selecting the control mode (Control mode in S3), the make-up simulator 1 sets the control mode as the operation mode thereof (S5). In specific, the make-up simulator 1 writes information indicating that the operation mode thereof is the operation mode to the operation mode register of the control unit 13.

When the input received via the touch panel monitor 3 is an input for selecting one of the view mode and the control mode, a processing-target image specification flag is initialized following Step S4 (in the case of view mode) or Step S5 (in the case of control mode) (S6). In specific, the make-up simulator 1 deletes the contents of a processing-target image specification register of the control unit 13. The deletion of the contents of the processing-target image specification register is performed in order to avoid a situation where newly writing an image to the frame memory 12 is impossible due to an image already being held in the frame memory 12. This processing is described later in detail.

Meanwhile, when the user does not perform any input for selecting an operation mode (No in S2), the make-up simulator 1 terminates the setting of operation mode.

<Frame-by-Frame Operations>

Figure 4:
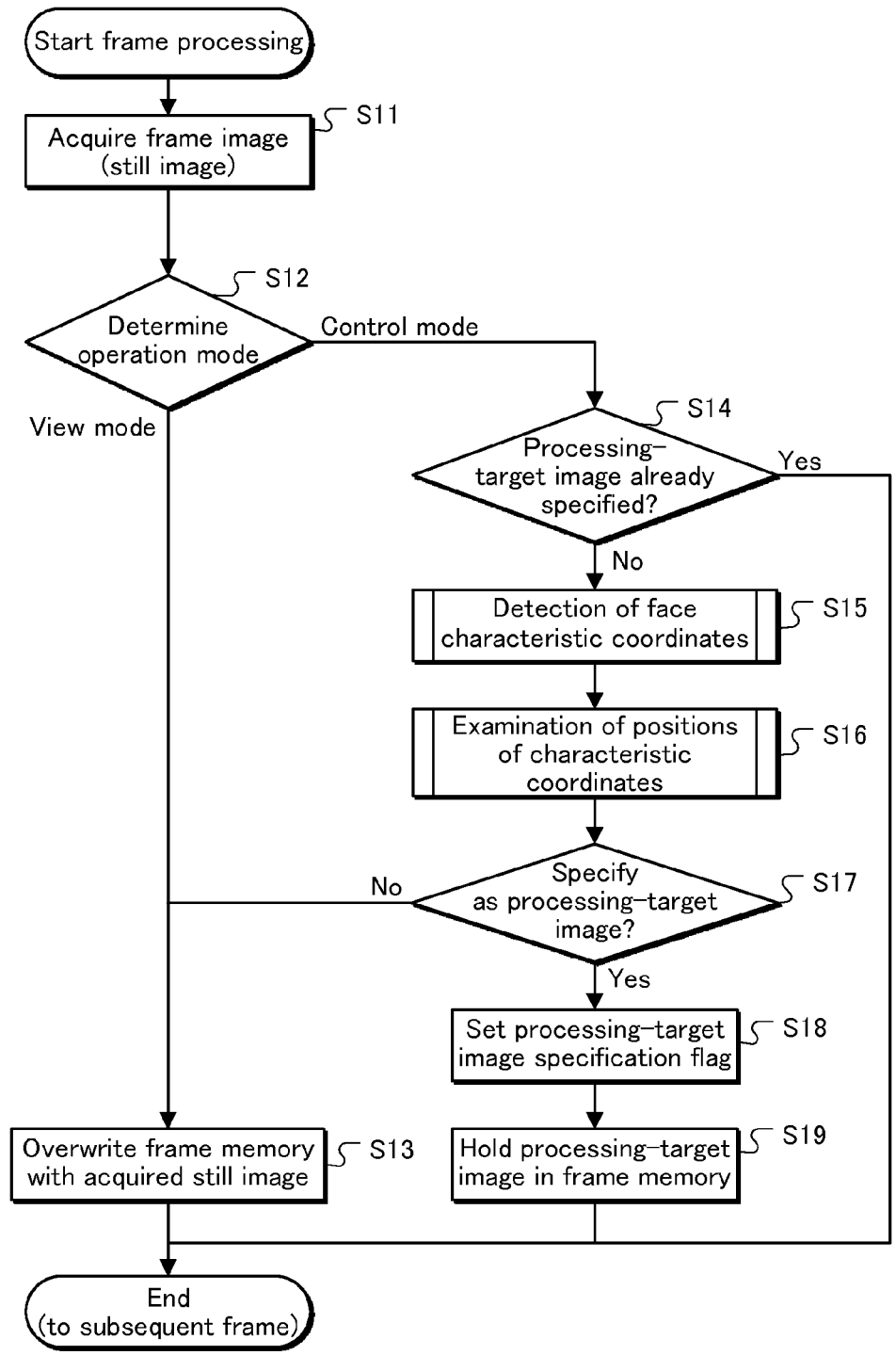
FIG. 4 is a flowchart illustrating operations that the make-up simulator in embodiment 1 performs for each frame.

The following describes operations performed frame by frame, with reference to FIG. 4. The following focuses on a case where the make-up simulator 1 does not perform any image processing (make-up processing), and thus merely operates as a digital mirror.

The camera 2 of the make-up simulator 1 outputs one frame image (still image) constituting a video of the user. (S11)

Subsequently, the control unit 13 of the make-up simulator 1 determines the current operation mode of the make-up simulator 1 (S12). In specific, the control unit 13 determines the current operation mode based on setting information read out from the operation mode register.

When in the view mode, the make-up simulator 1 overwrites the frame memory 12 by using still images output from the camera 2 (S13). In specific, the control unit 13 repeatedly transmits image output instructions to the characteristic coordinate detector 11, whereby the frame memory 12 receives still images one after another via the characteristic coordinate detector 11 and stores still images therein one at a time. This results in the latest frame image captured by the camera 2 being stored as-is to the frame memory 12.

Meanwhile, when in the control mode, the make-up simulator 1 executes the processing described in the following.

First, the control unit 13 of the make-up simulator 1 determines whether or not the still image for receiving make-up related control by the user has been already determined (S14). In specific, the control unit 13 checks whether or not information indicating that the still image for receiving make-up related control by the user has already been specified is stored in the processing-target image specification register.

When the still image for receiving make-up related control by the user has already been specified (Yes in S14), the make-up simulator 1 terminates processing with respect to the current frame image. In this case, the control unit 13 does not transmit an image output instruction to the characteristic coordinate detector 11. Thus, the still image for receiving make-up related control by the user, which is a frame image output from the camera 2 at least one frame before the current frame image, remains stored in the frame memory 12.

Meanwhile, when the still image for receiving make-up related control by the user has not been specified yet (No in S14), the characteristic coordinate detector 11 of the make-up simulator 1 detects face characteristic coordinates in the current frame image (S15).

Figure 5:
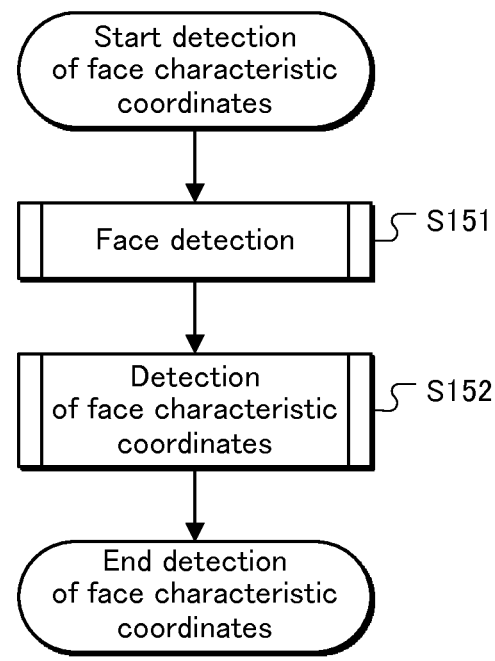
FIG. 5 is a flowchart illustrating procedures for detecting face characteristic coordinates.

The following describes the processing in Step S15, with reference to FIG. 5. First, the characteristic coordinate detector 11 detects a face in the current frame image, specifies the area of the face in the frame image, and outputs coordinates indicating the face area as characteristic coordinates (S151). Subsequently, the characteristic coordinate detector 11 detects face parts (e.g., an eye, the nose, the mouth, and an eyebrow) in the face area, and for each face part, outputs coordinates specifying the outline of the face part as characteristic coordinates (S152).

Explanation referring to FIG. 4 resumes. Subsequently, the control unit 13 of the make-up simulator 1 examines positions of detected characteristic coordinates (S16). In specific, in order to determine whether or not the frame image is suitable as the still image for receiving make-up related control by the user, the control unit 13 examines the direction that the face in the frame image is facing, the state of the face in the frame image, etc., based on positions of face characteristic coordinates.

Figure 6:
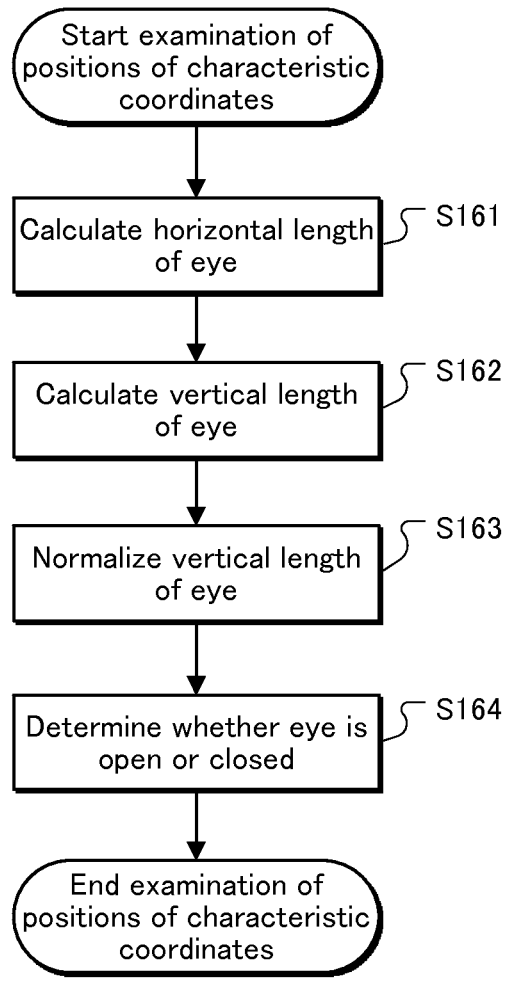
FIG. 6 is a flowchart illustrating procedures for examining whether an eye is open or closed.
Figure 7:
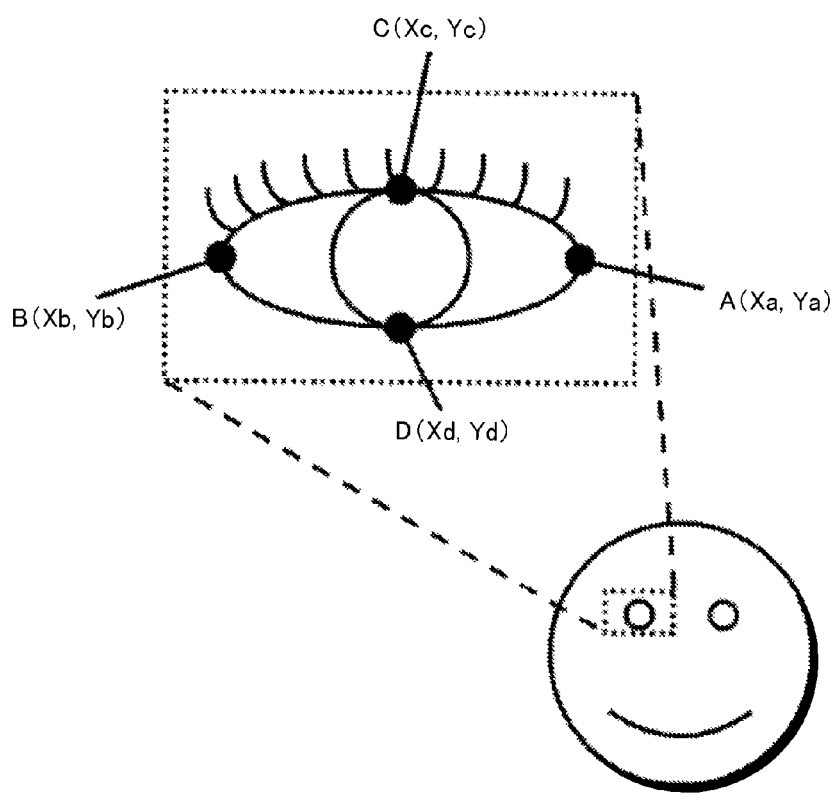
FIG. 7 illustrating positions of characteristic coordinates corresponding to an eye.

The following describes the processing in Step S16, with reference to FIG. 6. FIG. 6 illustrates a case where an assumption has been made that an image in which a user eye is closed is not appropriate as the still image for receiving make-up related control by the user, and thus the control unit 13 examines whether an eye is open or closed in the current frame image. Further, FIG. 6 illustrates a case where in Step S15, four characteristic coordinates related to an eye have already been acquired. Namely, the four characteristic coordinates are: the coordinates (Xa, Ya) for the inner corner of the eye (indicated by "A" in FIG. 7); the coordinates (Xb, Yb) for the outer corner of the eye (indicated by "B" in FIG. 7); the coordinates (Xc, Yc) for the upper end of the eye (indicated by "C" in FIG. 7); and the coordinates (Xd, Yd) for the lower end of the eye (indicated by "D" in FIG. 7).

First, the control unit 13 calculates the length of the eye in the horizontal direction (S161). The horizontal length (Lh) of the eye can be calculated as the distance between the inner corner A and the outer corner B of the eye. The following expresses this calculation.

$$Lh = \sqrt{(Xb-Xa)^2 + (Yb-Ya)^2} \quad \text{[Math. 1]}$$

Subsequently, the control unit 13 calculates the length of the eye in the vertical direction (S162). The vertical length (Lv) of the eye can be calculated as the distance between the upper end C and the lower end D of the eye. The following expresses this calculation.

$$Lv = \sqrt{(Xd-Xc)^2 + (Yd-Yc)^2} \quad \text{[Math. 2]}$$

Subsequently, the control unit 13 normalizes the vertical length of the eye (S163). In specific, the control unit 13 acquires the normalized vertical length (Lvn) of the eye by dividing the vertical length (Lv) by the horizontal length (Lh). That is, calculation is performed of Lvn=Lv/Lh.

Finally, the control unit 13 determines whether the eye is open or closed based on whether or not the normalized vertical length (Lvn) of the eye exceeds a predetermined threshold value (S164).

Explanation referring to FIG. 4 resumes. The control unit 13 of the make-up simulator 1 determines whether or not to specify the current frame image as the still image for receiving make-up related control by the user (S17). The control unit 13 performs this determination based on the result of the examination of positions of characteristic coordinates performed in S16. Referring to the case illustrated in FIGS. 6 and 7, the current frame image is specified as the still image for receiving make-up related control by the user if the eye is open, whereas the current frame image is not specified as the still image for receiving make-up related control by the user if the eye is closed.

When specifying the current frame image as the still image for receiving make-up related control by the user (Yes in Step S17), the control unit 13 of the make-up simulator 1 sets the processing-target image specification flag (S18). In specific, the control unit 13 stores, to the processing-target image specification register, information indicating that the still image for receiving make-up related control by the user has already been specified. This results in the current frame image remaining stored in the frame memory 12 as the still image for receiving make-up related control by the user without being overwritten with any frame image subsequent to the frame image, until the processing-target image specification flag is cleared. Clearing of the processing-target image specification flag occurs when the operation mode switches from the control mode to the view mode.

Finally, the control unit 13 stores the current frame image to the frame memory 12 (S19). As a result, the current frame image becomes the still image for receiving make-up related control by the user. Thus, the user is able to perform control such as control for changing simulation processing settings by using the still image suitable for receiving make-up related control by the user.

Meanwhile, when not specifying the current frame image as the still image for receiving make-up related control by the user (No in Step S17), the make-up simulator 1 overwrites the frame memory 12 by using a subsequent frame image output from the camera 2 (S13). In specific, the control unit 13 transmits an image output instruction to the characteristic coordinate detector 11, and thus the frame memory 12 stores the subsequent frame image therein. This results in the latest frame image captured by the camera 2 being stored as-is to the frame memory 12, and further, the still image for receiving make-up related control by the user being specified from among subsequent frame images corresponding to frames subsequent to the current frame.

<Operations in Make-up Simulation>

Figure 8:
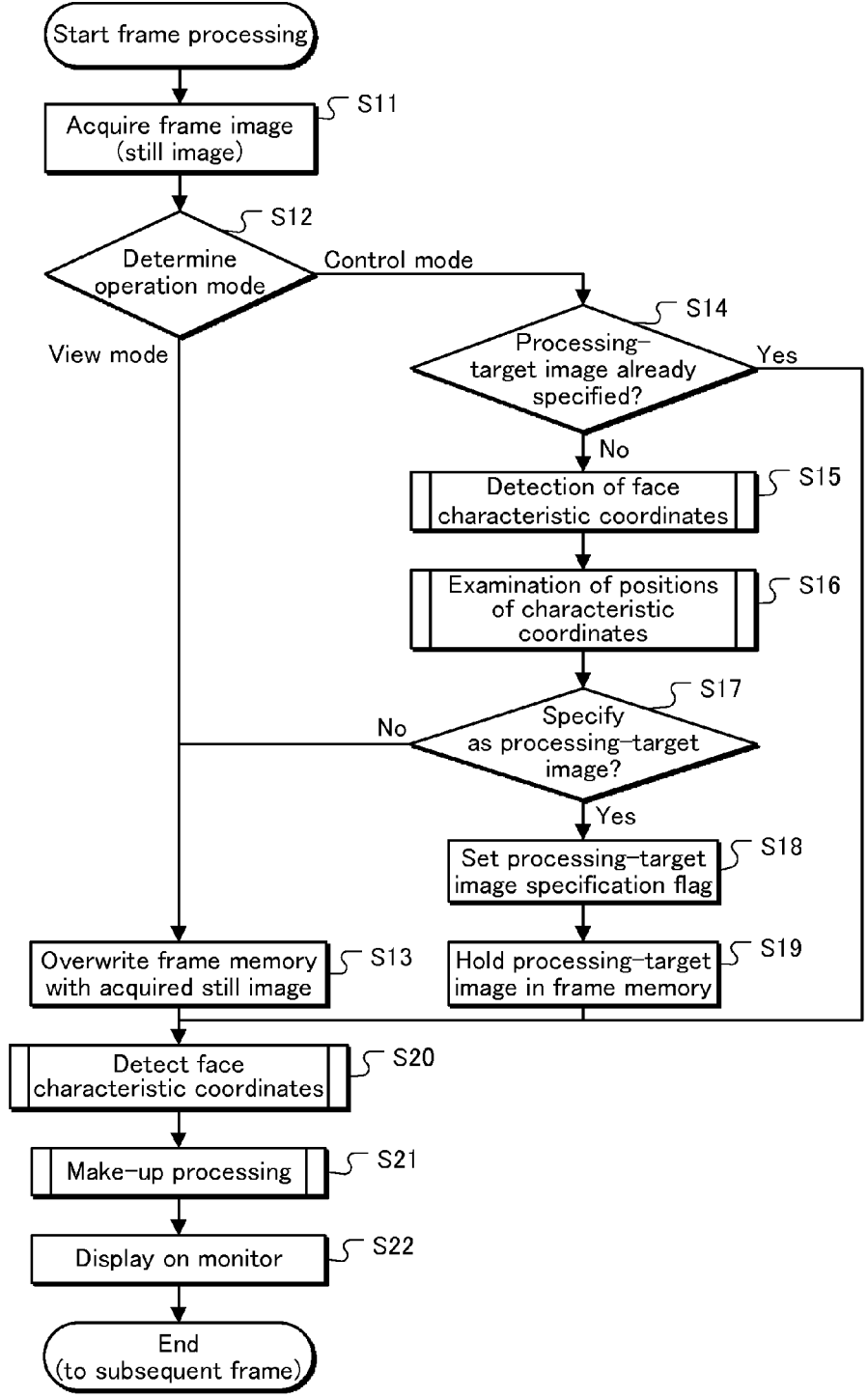
FIG. 8 is a flowchart illustrating operations that the make-up simulator in embodiment 1 performs for each frame in make-up simulation.

FIG. 8 illustrates the operations of the make-up simulator 1 in make-up simulation. Note that in FIG. 8, operations similar to those already illustrated in FIG. 3 are indicated by using the same step numbers as those in FIG. 3. Further, the following does not include explanation regarding such similar operations.

The characteristic coordinate detector 11 reads out the still image for receiving make-up related control by the user having been stored to the frame memory 12, and detects characteristic coordinates, in the still image for receiving make-up related control by the user, corresponding to the face part that is a subject of make-up simulation (S20). For example, the characteristic coordinates detected in Step S20 may be the characteristic coordinates corresponding to an eye, characteristic coordinates corresponding to the nose, characteristic coordinates corresponding to the mouth, characteristic coordinates corresponding to an eyebrow, or characteristic coordinates corresponding to the outline of the face.

Subsequently, the image processor 14 executes make-up processing (S21). The make-up processing in Step S21 is performed based on the specifics received from the user during the control mode, via the control display area and the image display area of the touch panel monitor 3. For example, when the user has selected lipstick A displayed in the image display area and has traced the lips with the lipstick A during the control mode, the make-up processing involves applying lipstick A onto the lips. In this example, the image processor 14 specifies the position of the lips based on the characteristic coordinates of the mouth detected in Step S20. Further, the image processor 14 creates an image layer for lipstick A, and composites the image layer with the still image for receiving make-up related control by the user.

Finally, the make-up simulator 1 displays the processed image generated by the image processor 14 on the touch panel monitor 3 (S22).

<Conclusion>

The above-described configuration, in particular the examination of positions of characteristic coordinates in S16, enables acquiring a still image suitable for receiving make-up related control by the user without being affected by user blinks, etc., and regardless of when the user sets the operation mode to the control mode. This enables the user to check the results of make-up simulation without much worry and care, and reduces the time and effort involved when actually having to try on cosmetics.

<Supplement>

(1) In Step S2 above, the specifics of a user instruction are confirmed with the user by, for example, displaying the icon selected by the user in inverted color or emphasizing the frame of the icon selected by the user. Alternatively, the user may be notified of the specifics of a user instruction (i.e., a change in operation mode one mode to another) in the form of a predetermined sound.

(2) In Step S1 above, the make-up simulator 1 displays a GUI on the touch panel monitor 3, and in Step S2 above, the make-up simulator 1 checks whether or not the user has performed input. In Step S2, the instruction issued by the user (i.e., the input performed by the user) need not be an instruction issued through input via the touch panel monitor 3. That is, the instruction may be issued by the user performing input via an input device other than the touch panel monitor 3, one example of which is a computer mouse. Alternatively, the instruction may be issued by the user making a gesture that the make-up simulator 1 is able to recognize in one or more images captured by the camera 2.

Further, the make-up simulator 1 may set the operation mode thereof as follows. For example, the make-up simulator 1 may treat a touch to the image display area of the touch panel monitor 3 as an input (i.e., an instruction) to change the operation mode. In this example, when the user touches the image display area, the make-up simulator 1 switches from one to the other of the view mode and the control mode.

(3) In Step S1 above, the make-up simulator 1 commences setting of operation mode in response to a touch by the user to the image display area of the touch panel monitor 3. Alternatively, the make-up simulator 1 may automatically set a specific one of the two operation modes when, for example, detecting a predetermined situation. In specific, the make-up simulator 1 may temporarily switch from the view mode to the control mode when a sudden movement of the user or a sudden change in surroundings (for example, when the periphery of the make-up simulator 1 suddenly turns dark due to a shadow being cast by some object) occurs. This modification prevents display of inappropriate images. Further, when making this modification, the make-up simulator 1 may automatically return to the view mode once determining that the change in surroundings has settled down, or may return to the view mode in response to a user instruction.

(4) In Step S16 above, the horizontal length of the eye is used in the normalization of the vertical length of the eye. However, the normalization may be performed by using other values. One example of such values is the size/length of the entire face.

Further, the horizontal length (Lh) of the eye may be calculated through a simpler calculation of Lh=Xa−Xb. Similarly, the vertical length (Lv) of the eye may be calculated through a simpler calculation of Lv=Yd−Yc.

(5) In Step S16 above, the normalized vertical length of the eye is used in the examination of whether the eye is open or closed. Alternatively, the examination of whether the eye is open or closed may be performed, for example, as follows. The examination of whether the eye is open or closed may be performed based on the brightness or the color around a position of the iris, by estimating the position of the iris based on positions of characteristic coordinates of the eye. In this example, the position of the iris is assumed as where a straight line connecting the inner and outer corners of the eye and a straight line connecting the upper and lower ends of the eye intersect. Further, in this example, the eye is determined as being open when the brightness at the intersection is low or the color at the intersection is black, whereas the eye is determined as being closed when the brightness at the intersection is high or the color at the intersection is skin color.

(6) In Steps S16 and S17 above, the examination of whether the eye is open or closed is performed to determine whether or not the current frame image is suitable as the still image for receiving make-up related control by the user. Alternatively, for example, examination may be performed with respect to an area around the mouth in the current frame image and detection of smile intensity may be performed, in which case the determination of whether or not the current frame image is suitable as the still image for receiving make-up related control by the user is performed based on whether the user is smiling in the current frame image. In this example, the examination may be performed based, for example, on whether or not the corner of the mouth is oriented upwards. Further, the determination of whether or not the current frame image is suitable as the still image for receiving make-up related control by the user may be performed by using a combination of two or more of the characteristics described above.

Figure 9:
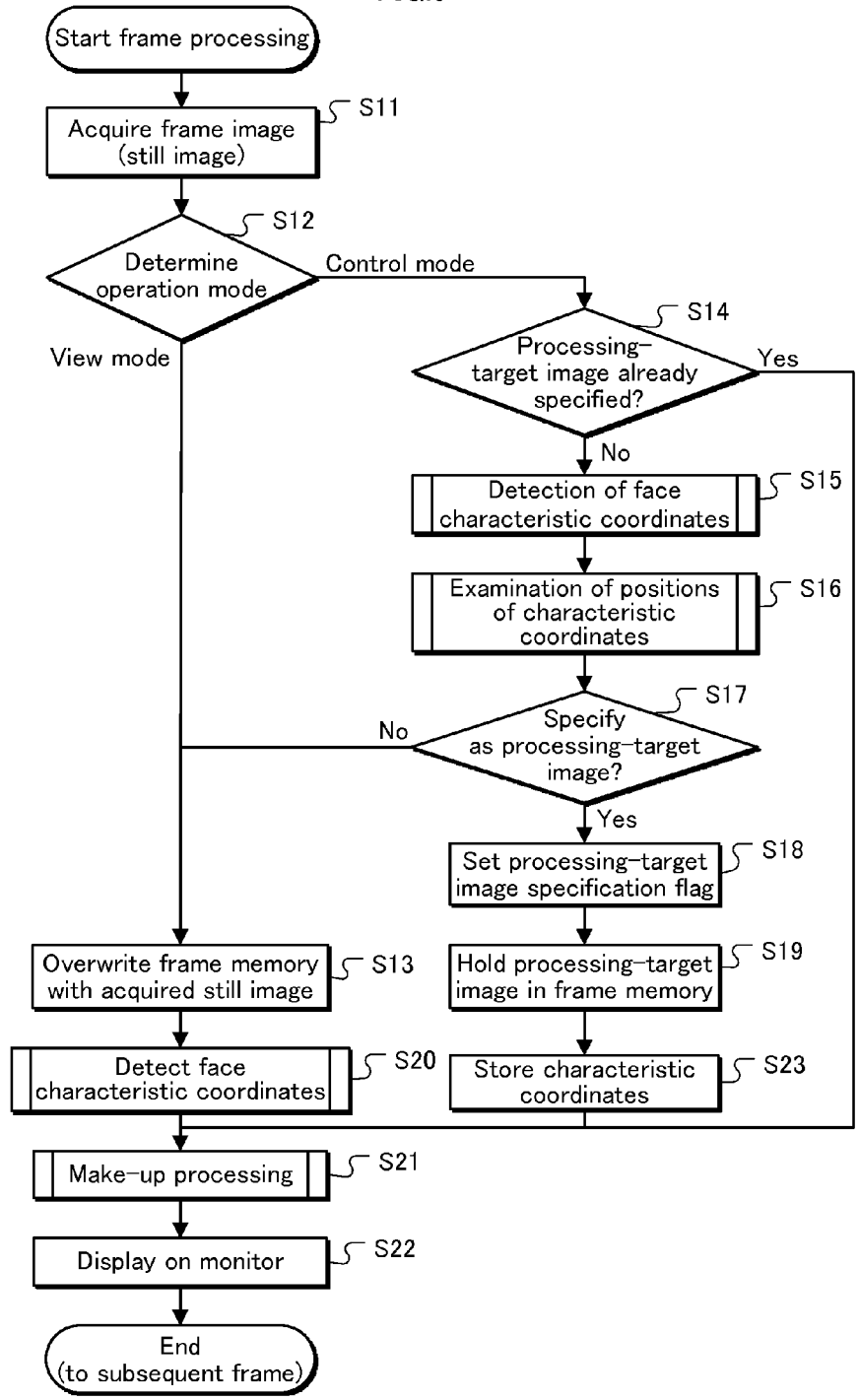
FIG. 9 is a flowchart illustrating operations that the make-up simulator in embodiment 1 performs for each frame in make-up simulation pertaining to Supplement (7) of embodiment 1.

(7) In Step S20 above, the characteristic coordinate detector 11 detects characteristic coordinates in the still image for receiving make-up related control by the user. Here, processing in Step S20 may be the exactly the same as the processing in Step S15. Alternatively, the characteristic coordinate detector 11 may detect in Step S20 only those characteristic coordinates necessary for make-up processing in Step S21. Alternatively, a modification may be made such that the results of the detection of characteristic coordinates in Step S15 are stored, and the make-up processing in Step S21 is performed by using the characteristic coordinates so stored. FIG. 9 is a flowchart illustrating this modification. In specific, storing of the results of Step S15 is performed in Step S23, and in Step S21, the results so stored are used in place of the results of Step S20. This modification eliminates the need of having to perform the detection of characteristic coordinates in Step S20 (i.e., the need of having to perform the detection of characteristic coordinates twice) when the still image for receiving make-up related control by the user is stored to the frame memory 12, and thus reduces processing load.

(8) In embodiment 1, the touch panel monitor 3 has only two display areas each displaying different contents (namely, the image display area and the control display area). Alternatively, for example, the touch panel monitor 3 may additionally display information regarding recommended make-up styles. This further enhances user convenience.

<Embodiment 2>

Embodiment 1 describes a case where the examination of positions of characteristic coordinates is performed for each frame. Meanwhile, the present embodiment describes a case where interpolation of characteristic coordinates is performed based on a plurality of frame images.

Figure 10:
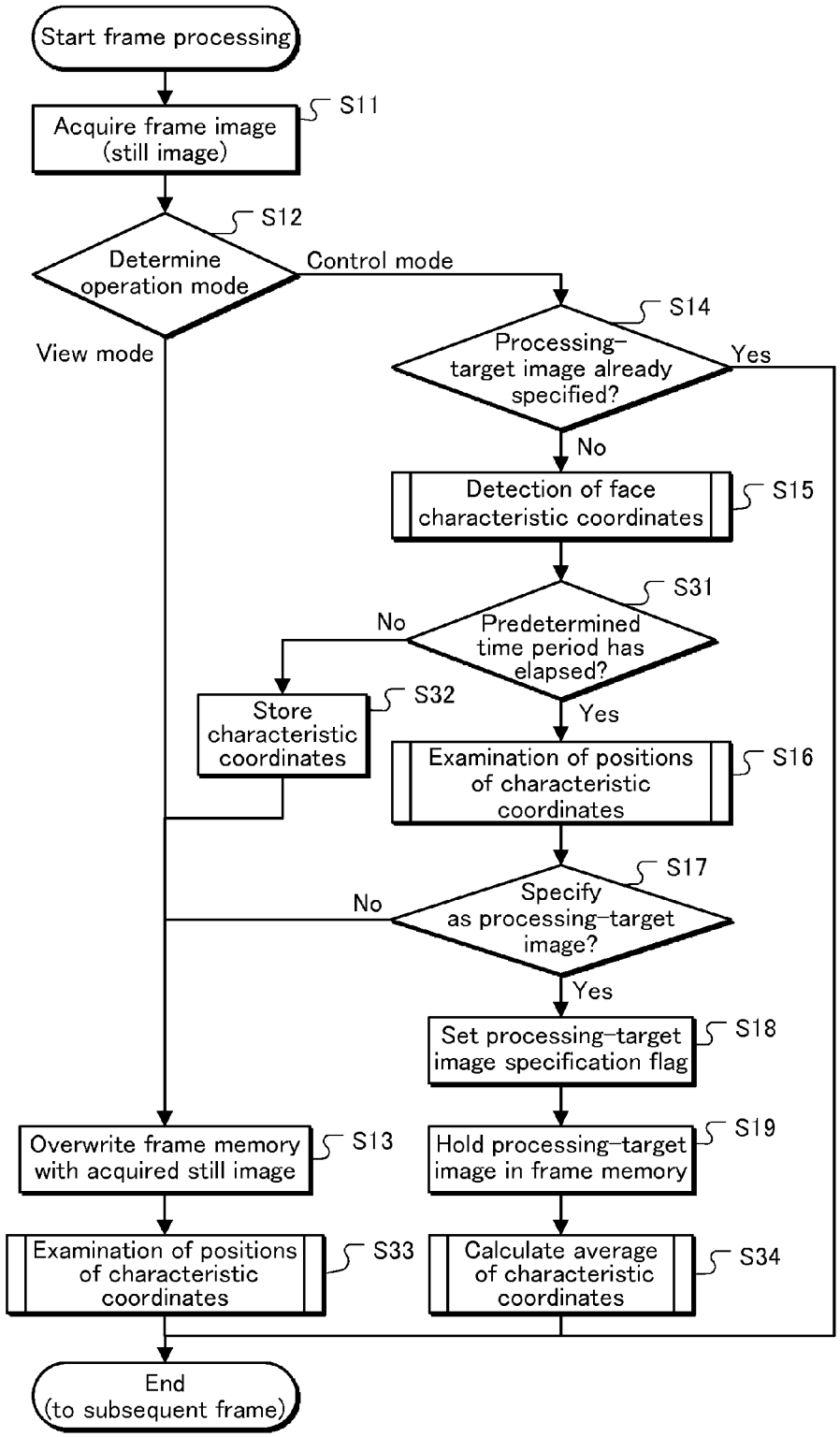
FIG. 10 is a flowchart illustrating operations that a make-up simulator in embodiment 2 performs for each frame.

FIG. 10 is a flowchart illustrating operations pertaining to the present embodiment. Note that in FIG. 10, operations similar to those already illustrated in FIG. 4 are indicated by using the same step numbers as those in FIG. 4. Further, the following does not include explanation regarding such similar operations.

<Filtering of Characteristic Coordinates>

In Step S31, the control unit 13 checks whether or not a predetermined time period has elapsed. In specific, the control unit 13 checks whether or not the number of frame images having been processed has reached a value yielded by multiplying the predetermined time period and the frame rate. For example, when the predetermined time period is two (2) seconds and the frame rate is sixty (60) frames per second (fps), the control unit 13 checks whether or not one hundred and twenty (120) frames have already been processed. Here, the measurement of the predetermined time period is commenced immediately after elapse of a previous iteration of the predetermined time period or when switching from the view mode to the control mode occurs, whichever one occurs later. In specific, the control unit 13 has a counter, and the counter is initialized in Step S5 or when Yes in Step S31.

When No in Step S31, the control unit 13 stores the characteristic coordinates of the current frame image to the frame memory 12 (S32), and following this, performs processing similar to when the current frame image is not specified as the still image for receiving make-up related control by the user (No in Step S17). Meanwhile, when Yes in Step S31, the control unit 13 performs the examination of positions of characteristic coordinates in Step S16, and determines whether or not the current frame image is to be stored to the frame memory 12 as the still image for receiving make-up related control by the user in Step S17.

When the current frame image is specified as the still image for receiving make-up related control by the user (Yes in S17), the control unit 13 stores the current frame image to the frame memory 12 as the still image for receiving make-up related control by the user in Step S19, and then calculates characteristic coordinate averages (S34).

The following describes Step S34 in detail. First, the controller 32, for each detected characteristic coordinate, calculates an average of corresponding characteristic coordinates stored in Step S32 up to this point. When providing explanation based on FIG. 7 for example, the controller 32 calculates, in a similar manner for each of the inner corner A, the outer corner B, the upper end C, and the lower end D, an average of a plurality of characteristic coordinates stored in the frame memory 12. Say the characteristic coordinate of the inner corner A in the $N^{th}$ frame is (Xan, Yan). Then, the average of the characteristic coordinates of the inner corner A is calculated as follows.

$$Xa_{ave} = \sum_{n=1}^{120} Xa_n / 120$$

$$Ya_{ave} = \sum_{n=1}^{120} Ya_n / 120$$

[Math. 3]

This configuration enables calculating an average of positions of corresponding characteristic coordinates over time. This reduces the negative effect produced by one or more characteristic coordinates considerable as noise, which result from incorrect detection of characteristic coordinates, undesirable fluctuation of characteristic coordinates, and the like. Accordingly, this configuration achieves acquiring positions of characteristic coordinates while eliminating fluctuation.

<Make-up Simulation>

Figure 11:
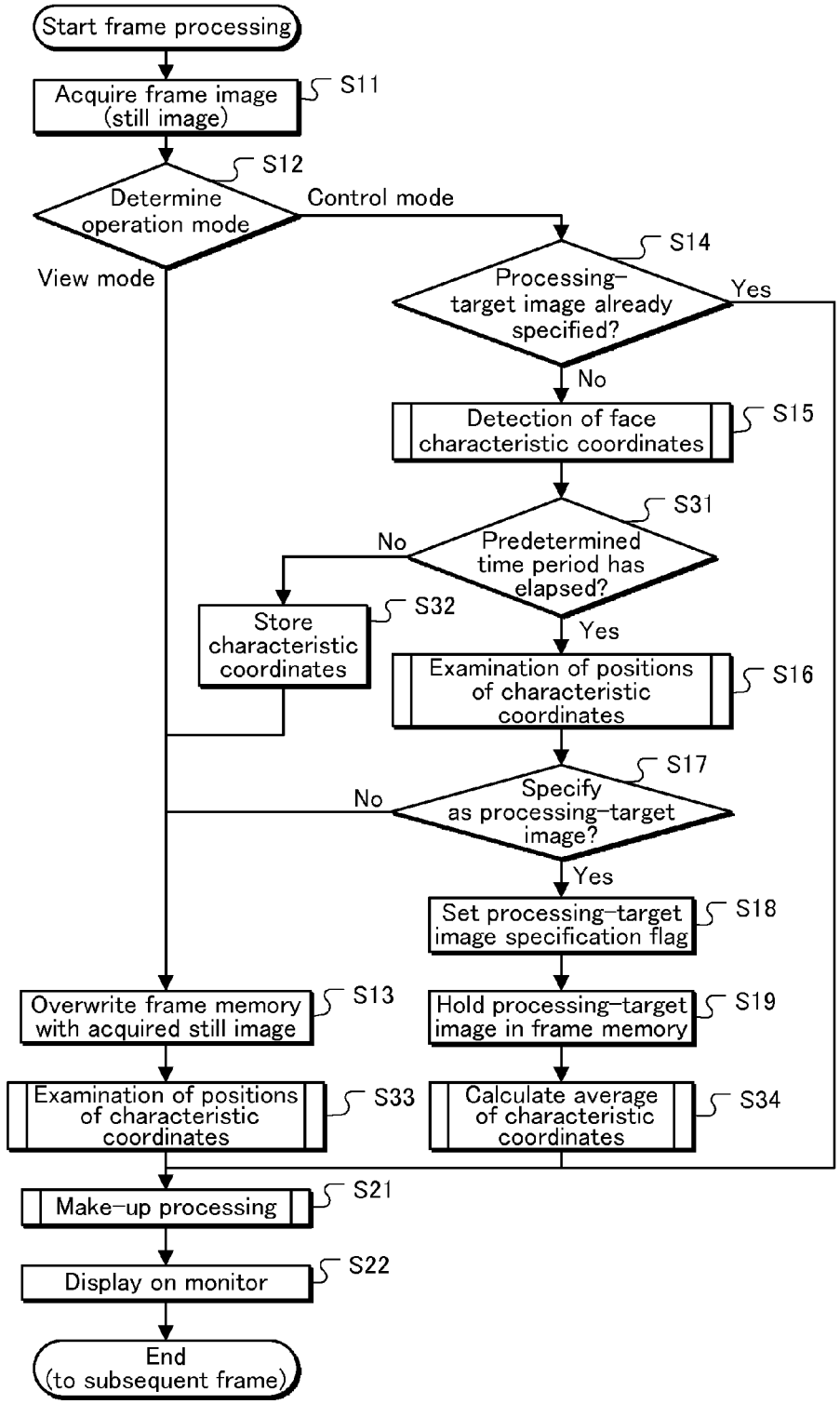
FIG. 11 is a flowchart illustrating operations that the make-up simulator in embodiment 2 performs for each frame in make-up simulation.

FIG. 11 is a flowchart illustrating the operations of the make-up simulator 1 in make-up simulation. Note that in FIG. 11, operations similar to those already illustrated in FIGS. 4, 8, and 9 are indicated by using the same step numbers as those in FIGS. 4, 8, and 9. Further, the following does not include explanation regarding such similar operations.

When the current operation mode is the control mode and the still image for receiving make-up related control by the user has already been specified, the image processor 14 executes the make-up processing in Step S21 while using the averages of characteristic coordinates calculated in Step S34. For example, when the make-up processing involves applying a false eyelash, the image processor 14 detects the positions of the eyelid and the eyelash and applies the false eyelash, by using averages of characteristic coordinates of the inner corner A, the outer corner B, the upper end C, and the lower end D.

This processing prevents fluctuation of characteristic coordinates, and thus achieves make-up simulation without fluctuation.

<Supplement>

(1) In Step S34 above, the arithmetic mean (i.e., averaging) of corresponding characteristic coordinates over time is performed. However, other types of filtering are also applicable. For example, similar to the median filter, only the median among similar characteristic coordinates for different time points may be selected.

Figure 12:
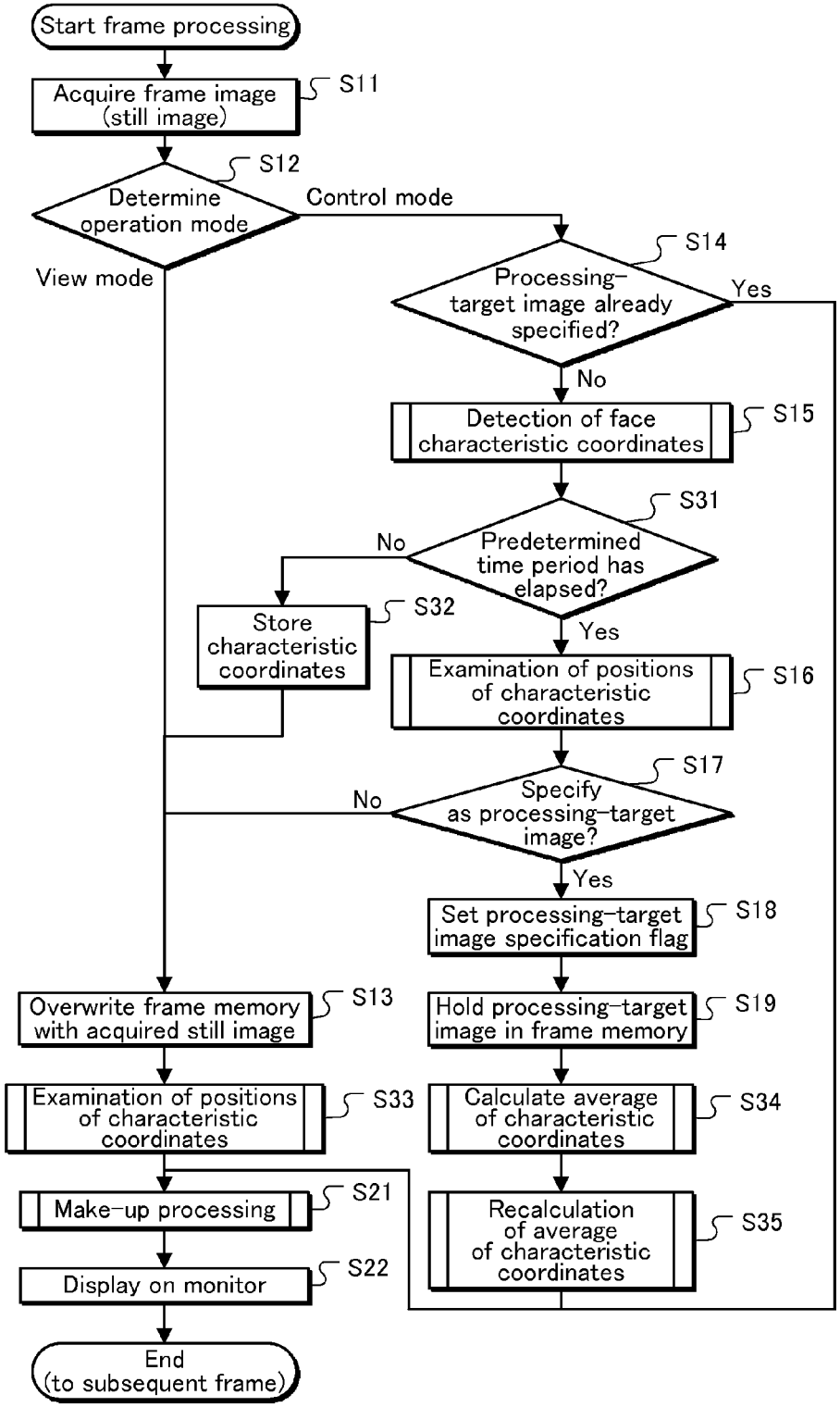
FIG. 12 is a flowchart illustrating operations that the make-up simulator in embodiment 2 performs for each frame in make-up simulation pertaining to Supplement (2) of embodiment 2.

(2) In Step S34 above, characteristic coordinate averages are calculated. In addition, recalculation of the characteristic coordinate averages may be performed. FIG. 12 is a flowchart illustrating frame-by-frame processing pertaining to this modification. In FIG. 12, after characteristic coordinate averages are calculated in Step S34, recalculation of the characteristic coordinate averages is performed (S35).

Figure 13:
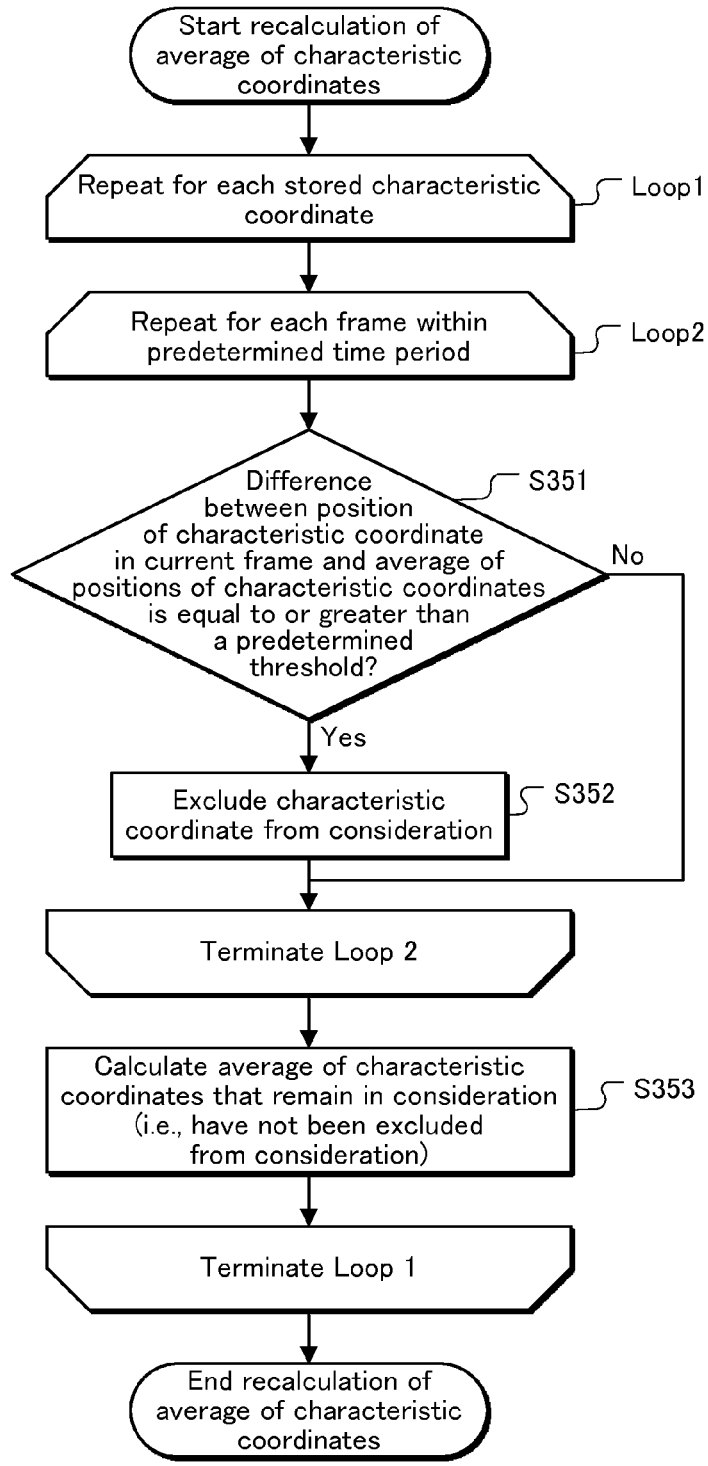
FIG. 13 is a flowchart illustrating procedures for recalculating an average of positions of face characteristic coordinates in embodiment 2.

The following describes the processing in Step S35, with reference to FIG. 13. First, the controller 32 executes Loop 1 for each characteristic coordinate having been stored through execution of Step S32. In Loop 1, the controller 32 executes Loop 2 for each frame image within the predetermined time period. In Loop 2, the controller 32 compares the average of characteristic coordinates calculated in Step S34 and the characteristic coordinate in the current frame image, and determines whether or not a difference between the characteristic coordinate average and the characteristic coordinate in the current frame image is equal to or greater than a predetermined threshold. When the difference is equal to or greater than the predetermined threshold, the characteristic coordinate in the current frame image is excluded from consideration (S351). This filtering excludes from consideration a characteristic coordinate considerably distant from the characteristic coordinate average. Subsequently, after the completion of Loop 1 and Loop 2, an average of characteristic coordinates (characteristic coordinates that remain in consideration) is calculated.

This processing prevents fluctuation of characteristic coordinates to a further extent.

<Embodiment 3>

The present embodiment describes the control mode and the view mode in detail.

Figure 14:
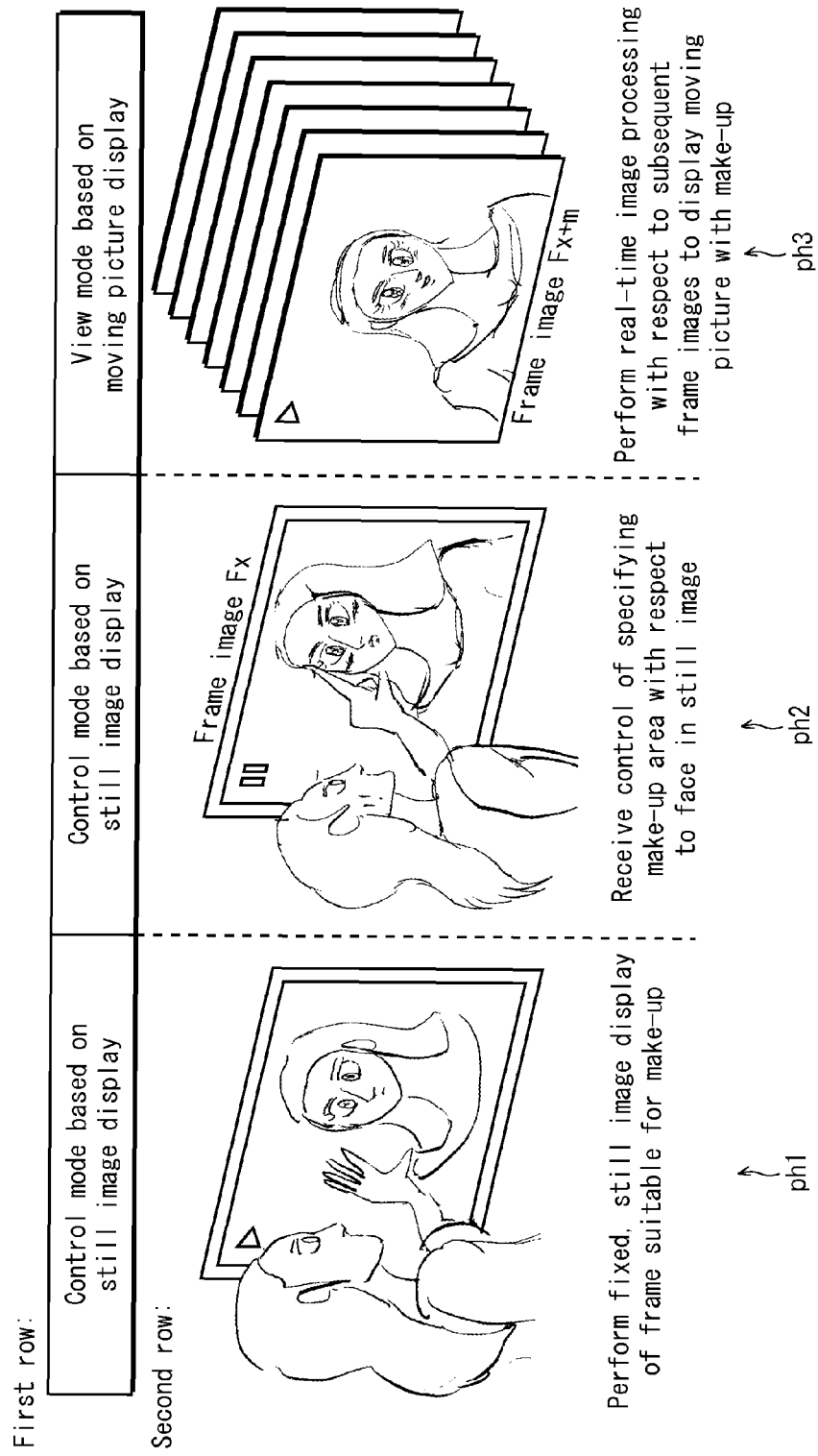
FIG. 14 illustrates phase transition occurring in response to mode switching.

FIG. 14 illustrates three phases, transition between which occurring in response to mode switching. The left-side phase (phase ph1) is a phase immediately following switching from the view mode to the control mode. As illustrated in the first row, this phase begins when the user performs, on the touch panel monitor 3, control for causing commencement of the control mode. In this phase, initially, frame images constituting a video are displayed one after another in real-time. As already discussed above, when a frame image displayed at a given point is suitable as the still image for receiving make-up related control by the user, the frame image is selected as the still image for receiving make-up related control by the user.

The middle phase (phase ph2) is a phase of receiving make-up related control that the user performs with respect to the selected still image. The first row of phase ph2 indicates that the current operation mode is the control mode. The second row of phase ph2 illustrates the user performing make-up related control. The frame image Fx illustrated in the second row is the still image selected in phase ph1. In phase ph2, with the frame image Fx, which is a captured still image and is a self portrait of the user, displayed in the image display area of the touch panel monitor 3, the user traces the surface of the touch panel monitor 3 by using a finger.

This finger-tracing control results in hand-drawn eyebrow images, hand-drawn blusher images, and a hand-drawn lipstick image being composited with the still image.

The right-side phase (phase ph3) illustrates a situation where the operation mode has been switched from the control mode to the view mode after hand drawing control in the control mode. The frame image Fx+m illustrated in phase ph3 is a given frame image constituting the video displayed in the view mode. In phase ph3, hand-drawn eyebrow images, hand-drawn blusher images, and a hand-drawn lipstick image based on the control performed in phase ph2 are mapped onto the corresponding parts (i.e., the eyebrows, the cheeks, and the lips, respectively) in each frame image succeeding the frame image Fx.

The mapping of each of these hand-drawn images is performed by extracting, from each frame image, a group of characteristic coordinates defining the outline of the corresponding part, and by calculating a conversion matrix for converting a group of characteristic coordinates included in the frame image into a group of characteristic coordinates in another frame image.

As already discussed above, groups of characteristic coordinates are detected in each of the frame images Fx and Fx+m due to Step S20 being performed for each of frame images Fx and Fx+m. Otherwise, groups of characteristic coordinates detected in frame image Fx in Step S15 are stored in Step S23. These groups of characteristic coordinates each define an outline of a corresponding part of the subject of virtual make-up. The make-up simulator 1 links each characteristic coordinate in the frame image Fx (still image) with the corresponding characteristic coordinate in the frame image Fx+m by searching for corresponding points in the two frame images. The search for corresponding points in the two frame images is performed by calculating, for a given pixel in the frame image Fx, values indicating a correlation between the pixel in the frame image Fx and pixels in the frame image Fx+m based on pixel luminance values or the like, and by detecting, in the frame image Fx+m, a pixel having the highest correlation value with respect to the pixel in the frame image Fx. Thus, when make-up related control, or more specifically, hand drawing control is performed with respect to a given part of the still image, a hand-drawn image pertaining to the make-up related control is mapped onto image parts of subsequent frame images that have been linked with the given part through the search for corresponding points.

Figure 15A:
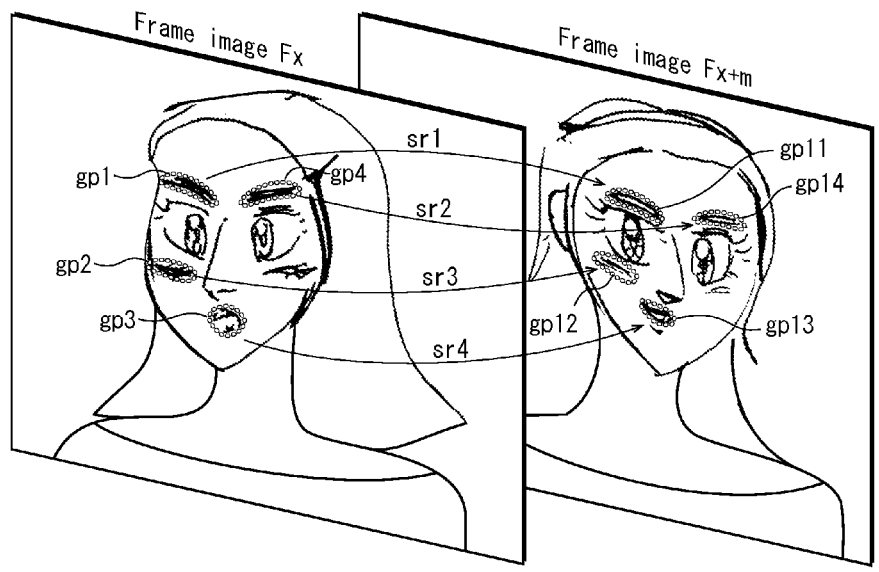
FIG. 15A illustrates a group of characteristic coordinates detected in frame image Fx and a group of characteristic coordinates detected in frame image Fx+m.

FIG. 15A illustrates groups of characteristic coordinates detected in the frame image Fx and groups of characteristic coordinates detected in the frame image Fx+m.

FIG. 15A illustrates four groups of characteristic coordinates, namely gp1, gp2, gp3, and gp4. The groups gp1, gp2, gp3, and gp4 are groups of characteristic coordinates each surrounding a corresponding one of representative parts of the face (i.e., an eyebrow, the lips, or a cheek) in the frame image Fx, and thus define the outline of the corresponding part in the frame image Fx. FIG. 15A also illustrates four groups of characteristic coordinates, namely gp11, gp12, gp13, and gp14. The groups gp11, gp12, gp13, and gp14 are groups of characteristic coordinates each surrounding a corresponding one of the representative parts of the face in the frame image Fx+m, and thus define the outline of the corresponding part in the frame image Fx+m. Arrows sr1, sr2, sr3, and sr4 schematically illustrate the search for corresponding points performed to link characteristic coordinates in the frame image Fx and the corresponding characteristic coordinates in the frame image Fx+m. Through the search for corresponding points, a link is defined between the group of characteristic coordinates in the frame image Fx that defines an eyebrow and the group of characteristic coordinates in the frame image Fx+m that defines the same eyebrow.

Figure 15B:
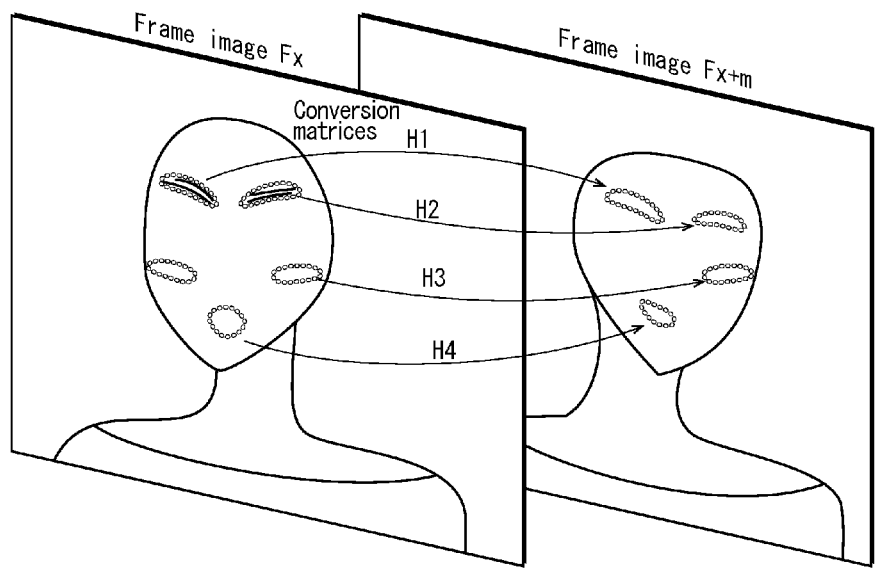
FIG. 15B illustrates conversion matrices defining conversion of characteristic coordinates in frame image Fx into characteristic coordinates in frame image Fx+m.

FIG. 15B illustrates conversion matrices defining conversion of characteristic coordinates in the frame image Fx into characteristic coordinates in the frame image Fx+m. Each of H1, H2, H3, and H4 in FIG. 15B is a conversion matrix defining conversion of characteristic coordinates corresponding to a given part in the frame image Fx into characteristic coordinates corresponding to the same part in the frame image Fx+m. By using these conversion matrices, hand-drawn images yielded as a result of the user performing hand-drawing control with respect to the frame image Fx are mapped onto the frame image Fx+m. In this way, the hand-drawn images, after being transformed according to the positions of characteristic coordinates in the frame image Fx+m, are displayed on the frame image Fx+m.

The characteristic coordinates i1, i2, i3, i4, . . . , i8 in the top-left part of FIG. 16A characterize the shape of an eyebrow of the face in the frame image Fx. The characteristic coordinates j1, j2, j3, j4, . . . , j8 in the top-right part of FIG. 16A characterize the shape of an eyebrow of the face in the frame image Fx+m.

FIG. 16B illustrates a conversion matrix H. The conversion matrix H is a matrix converting the characteristic coordinates i1, i2, i3, i4, . . . , i8 in the frame image Fx into the characteristic coordinates j1, j2, j3, j4, . . . , j8 in the frame image Fx+m, and consists of 8×8 matrix components.

As discussed above, once the still image for receiving make-up related control by the user is specified, characteristic coordinates are extracted for each face part in the still image. Further, each time a frame image subsequent to the still image becomes the current processing target image in the view mode, characteristic coordinates are extracted from the current processing target image. Further, a conversion matrix defining a relationship between characteristic coordinates in the still image specified in the control mode and characteristic coordinates in the current processing target image in the view mode are calculated, and by using the conversion matrix for the current processing target image, hand-drawn images are mapped onto the current processing target image. Thus, make-up simulation in the view mode, performed with respect to frame images subsequent to the still image specified in the control mode, is realized.

FIG. 16C illustrates a situation where the user is drawing a hand-drawn image with respect to the still image specified in the control mode. The track trk1 in FIG. 16C is a track created when the user traces a part of the face appearing in the image display area of the touch panel monitor 3, and is specified as a hand-drawn image. The arrow cv1 in FIG. 16C, between the left and right boxes, schematically illustrates conversion of the hand-drawn image using the conversion matrix H illustrated in FIG. 16B. Further, the hand-drawn image trk2 in FIG. 16C is a hand-drawn image that is yielded through the conversion using the conversion matrix H and composited with the frame image Fx+m. Performing conversion using the conversion matrix H as described above results in the hand-drawn image yielded when the user traces the face in the still image specified in the control mode being mapped onto the frame image Fx+m.

Figure 17:
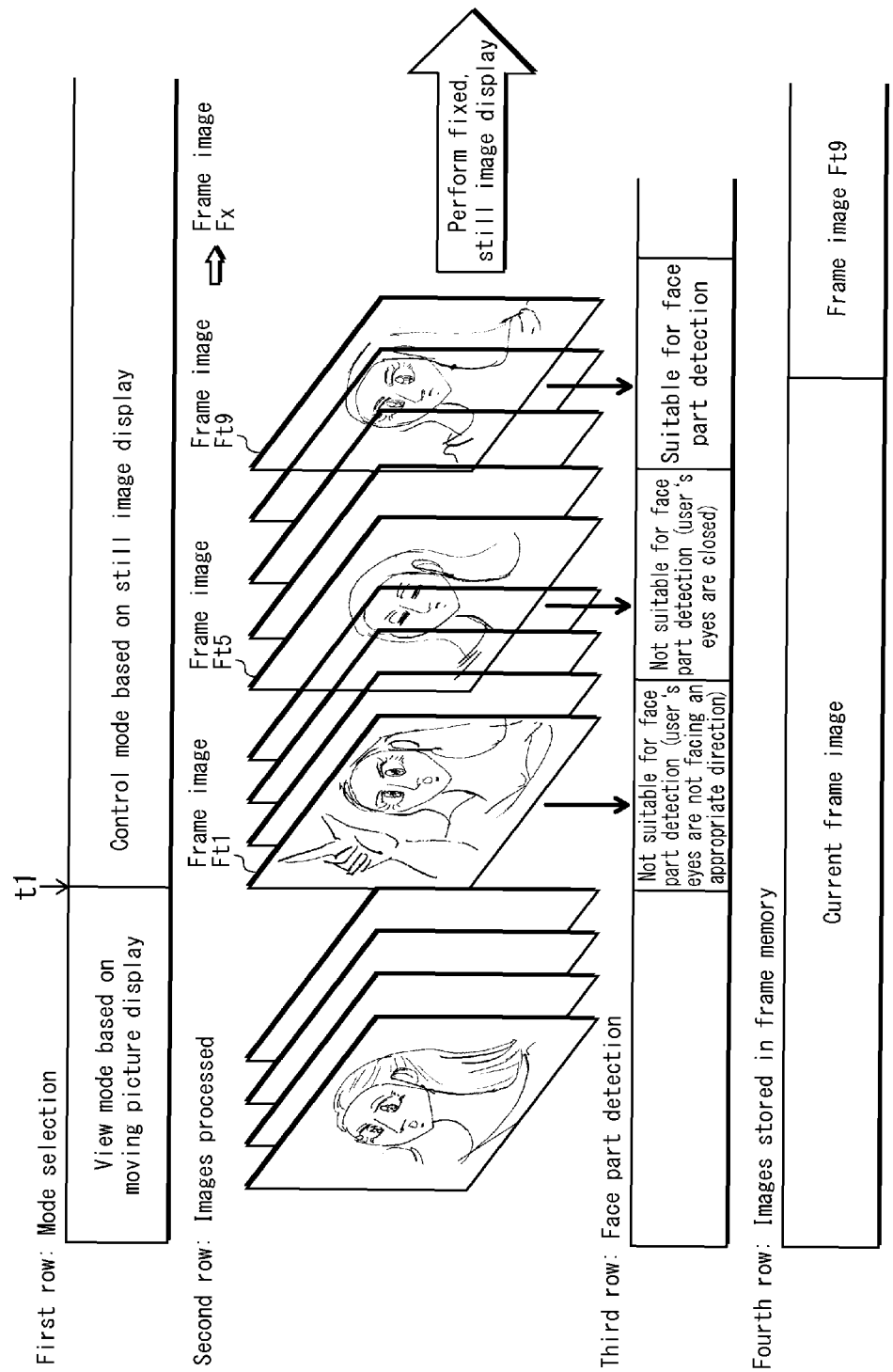
FIG. 17 illustrates, in a case where the operation mode has been switched from a view mode to a control mode, the process of specifying a still image serving as a basis of a subsequent iteration of the view mode.

FIG. 17 illustrates, in a case where the operation mode is switched from the view mode to the control mode, the process of specifying the still image for receiving make-up related control by the user, based on which make-up simulation in the view mode is executed. The first row illustrates the transition between operation modes, the second row illustrates frame images input from the camera 2, the third row illustrates face part detection based on the detection of characteristic coordinates, and the fourth row illustrates which image is stored in the frame memory 12. Time point t1 is when the operation mode is switched from the view mode to the control mode.

The frame image Ft1 in FIG. 17 is a frame image captured at time point t1. Since time point t1 is the moment when the user performs control with respect to the control display area of the touch panel monitor 3, the face of the user in the frame image Ft1 is not facing forward. Due to this, a determination is made, in the examination of positions of characteristic coordinates in Step S16, that the user's eyes are not facing an appropriate direction, and thus the frame image Ft1 is not specified as the still image for receiving make-up related control by the user in Step S17.

The frame image Ft5 in FIG. 17 is a frame image captured at a moment when the user has closed her eyes. Due to this, a determination is made, in the examination of positions of characteristic coordinates in Step S16, that the user's eyes are closed, and thus the frame image Ft5 is not specified as the still image for receiving make-up related control by the user in Step S17.

The frame image Ft9 in FIG. 17 is the first frame image captured with the user straightly facing the camera. Due to this, a determination is made, in the examination of positions of characteristic coordinates in Step S16, that the user is facing forward and that the user's eyes are open, and thus the frame image Ft9 is specified as the still image for receiving make-up related control by the user in Step S17. Accordingly, the frame image Ft9 is stored to the frame memory 12, and the image display area of the touch panel monitor 3 switches from real-time video display to still image display (i.e., the frame image Ft9 being displayed). Thus, the user is able to perform hand-drawing control with respect to the frame image Ft9.

Figure 18:
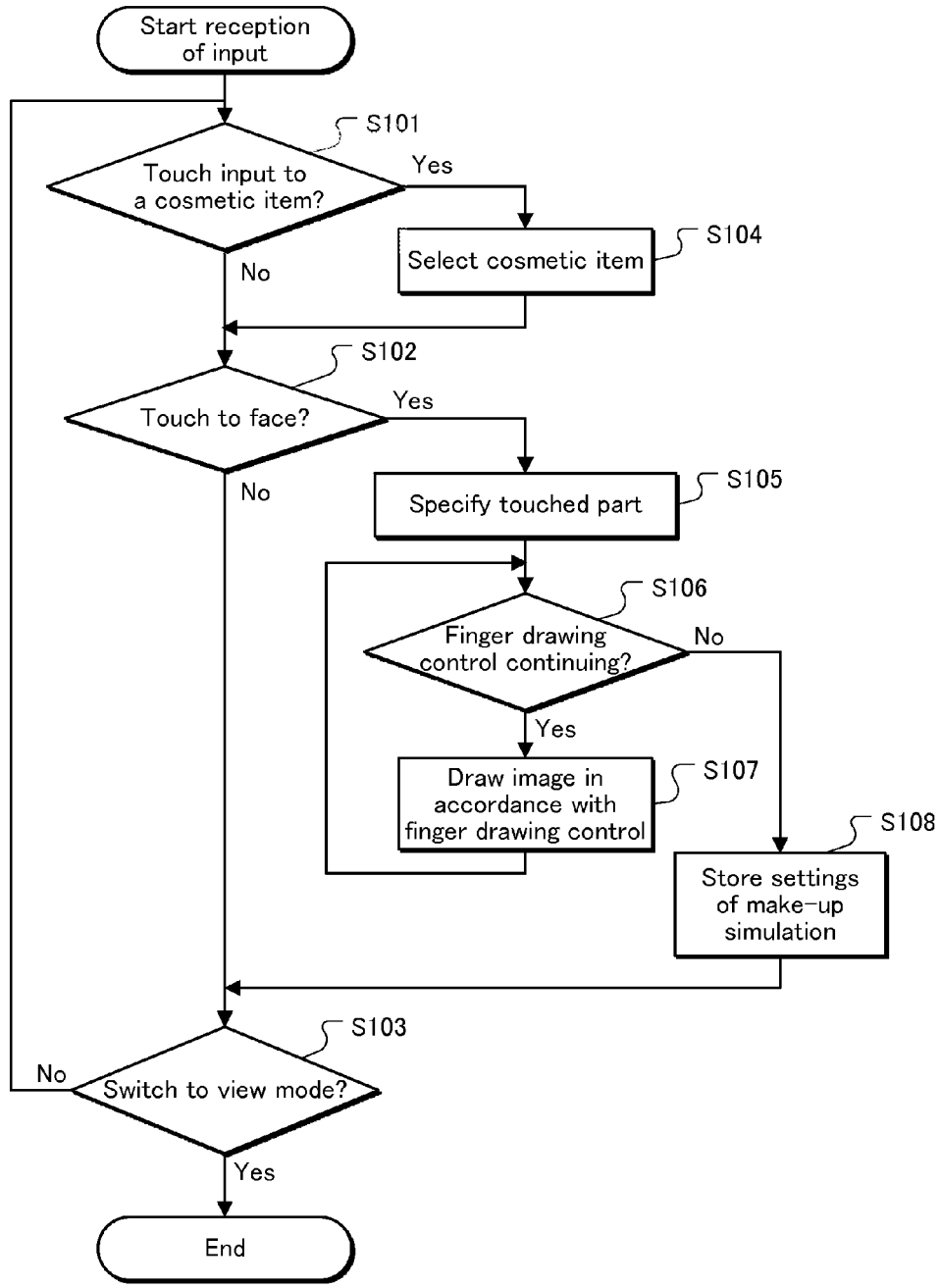
FIG. 18 is a flowchart illustrating reception of input related to make-up processing during the control mode.

FIG. 18 is a flowchart illustrating reception of input related to make-up related control during the control mode. Once the still image for receiving make-up related control by the user is specified in the control mode (Yes in Step S17), processing transitions to the loop starting from Step S101 and ending at Step S103. The loop includes: determining whether or not a touch to a virtual cosmetic item has occurred (S101); determining whether or not a touch to the face appearing in the still image has occurred (S102); and determining whether or not a change of operation mode to the view mode has occurred (S103). When Yes in Step S101, the virtual cosmetic item that is touched is selected (S104). When a touch to the face in the still image occurs, the part of the still image that is touched is specified (S105), and a determination is made of whether or not finger drawing control is still continuing (S106). When the finger drawing control is still continuing, drawing of a hand-drawn image in accordance with the finger drawing control continues (S107). When the finger drawing control ends, the hand-drawn image yielded as a result of the finger drawing control up to this point is stored as a setting for make-up simulation (S108).

Following this, when switching of operation mode from the control mode to the view mode occurs, make-up simulation in Step S21 is performed for each subsequent frame image, based on the setting stored in Step S108. In specific, face characteristic coordinates are extracted from the current frame image (Step S20), a part of the current frame image onto which the hand-drawn image is to be mapped is specified based on the extracted characteristic coordinates, and mapping of the hand-drawn image is executed.

<Conclusion>

This configuration allows the user to check his/her face wearing the make-up he/she desires, through a simple operation of selecting the necessary virtual cosmetic item and performing hand drawing control of the virtual cosmetic item with respect to the image of his/her face displayed on the touch panel monitor. Accordingly, the user is able to try on various types of make-up without actually having to wear make-up. Consequently, this configuration makes it possible to make a proposal of cosmetics most suiting the user.

<Other Modifications>

(1) In embodiments 1 through 3 above, the make-up simulator 1 includes the camera 2 and the touch panel monitor 3. However, the make-up simulator 1 need not include both the camera 2 and the touch panel monitor 3. For example, the make-up simulator 1 need not include the camera 2, in which case the make-up simulator 1 may acquire images from an external camera and the like. For example, the make-up simulator 1 need not include the touch panel monitor 3, and may include a monitor with only a display function, in place of the touch panel monitor 3. When making such a modification, the make-up simulator 1 may include an input device that is separate from the monitor. Further, when making such a modification, the monitor may have only the image display area and not the control display area.

(2) In embodiment 3 above, the instruction for image processing received from the user is based on hand drawing control performed by the user. However, other types of instructions of image processing are also possible. For example, the instruction for image processing may be an instruction to change the color of a virtual cosmetic item that has already been applied in response to a previous instruction. This modification enables the user to compare cosmetic items for the same face part that differ only in terms of color.

(3) In embodiments 1 through 3 above, the simulation is a make-up simulation and the subject of the simulation is the face. However, simulation may be performed of different types and with respect to different subjects. For example, the simulation may be a dress-up simulation, in which case the characteristic coordinates detected may include those for the shoulder, the arm, the chest, the hip, etc., detected from images of the upper half of the body or images of the entire body.

Further, the subject of simulation need not be a person. For example, the subject may be a car, and the simulation may be a simulation of attaching different parts, such as wheels and aerodynamic parts, to the car or simulation of different colorings of the car. In such a case, the characteristic coordinates detected may include those for the car roof, the windshield, and the front mirror, etc., detected from an external image of the car. Such modifications enable performing simulation by simply capturing images from around the subject, including front and lateral images of the subject.

(4) Up to this point, description has been provided based on embodiments of the technology pertaining to the present disclosure. However, the embodiments are non-limiting examples of forms of application of the technology of the present disclosure. Examples of other forms of application of the technology pertaining to the present disclosure include are but not limited to the following.

Each device described above is a computer system including a microprocessor, a ROM, a RAM, a hard-disk unit, a display unit, a keyboard, a mouse, etc. A computer program is stored on the RAM and/or the hard-disk unit. The microprocessor operates according to the computer program, and thereby allows each device to achieve functions thereof. Here, the computer program, in order to achieve predefined functions, is a combination of a plurality of instruction codes that indicate commands to the computer.

All or part of the constituent elements composing each of the above devices may be composed of a single system large scale integration (LSI). The system LSI is an ultra-multi-functional LSI manufactured by integrating multiple elements on one chip, and specifically a computer system including a microprocessor, a ROM, a RAM, etc. A computer program is stored on the RAM. The microprocessor operates according to the computer program, and thereby allows the system LSI to achieve functions thereof.

All or part of the constituent elements composing each of the above devices may be composed of a removable IC card or an individual module. The IC card or the module is a computer system composed of a microprocessor, a ROM, a RAM, etc. The IC card or the module may include the above-described ultra-functional LSI. The microprocessor operates according to the computer program, thereby allowing the IC card or the module to achieve functions thereof. The IC card or the module may be rendered tamper resistant.

One possible application of the technology according to the present disclosure is the method described above. Another possible application of the technology pertaining to the present disclosure is a computer program implementing the method by a computer, or a digital signal composed of the computer program.

Another possible application of the technology pertaining to the present disclosure is the computer program or the digital signal stored on a computer readable storage medium, such as, for example, a flexible disk, a hard disk, a CD-ROM, an MO, a DVD, a DVD-ROM, a DVD-RAM, a Blu-Ray Disc (BD) (registered trademark), a semi-conductor memory, etc. Another possible application of the technology pertaining to the present disclosure is the digital signal recorded on such a storage medium.

Another possible application of the technology pertaining to the present disclosure is the computer program or the digital signal transmitted via telecommunication lines, wired or wireless communication, a network such as the internet, a data broadcast, etc.

Another possible application of the technology pertaining to the present disclosure is a computer system including a microprocessor and memory, in which case the memory stores the above-described computer program, and the microprocessor operates according to the computer program.

Another possible application of the technology pertaining to the present disclosure is the computer program or the digital signal transferred by being stored to the storage medium or via the network, etc., and being implemented by another independent computer system The embodiments and modifications discussed above may be combined with one another.

(Supplement)

The following describes an image processing method, an image processing device, and an image processing program, each being one aspect of the present disclosure, and the effects of such aspects.

(1) One aspect of the present disclosure is an image processing method usable in an image processing system. The image processing system performs image processing with respect to a video input thereto and displays a result of the image processing. The image processing method includes: determining whether an operation mode of the system is a control mode or a view mode, the system performing still image display in the control mode and performing video display in the view mode; and performing processing in accordance with the operation mode. When the system is in the control mode, the processing in accordance with the operation mode includes: specifying a specific video frame image from among a plurality of video frame images of a video constituted of a plurality of video frame images each including an image of a subject of the image processing, the specific video frame image being a video frame image in which the image of the subject is suitable; displaying the specific video frame image as a still image; and receiving control related to the image processing from a user, via the image of the subject in the specific video frame image, and when the system is in the view mode, the processing in accordance with the operation mode includes: performing the image processing with respect to each video frame image that is input, one video frame image at a time; and displaying the result of the image processing for the user to view.

Another aspect of the present disclosure is an image processing device performing image processing with respect to a video input thereto and displaying a result of the image processing. The image processing device includes: an operation mode determiner determining whether an operation mode of the image processing device is a control mode or a view mode, the image processing device performing still image display in the control mode and performing video display in the view mode; an image processor performing processing in accordance with the operation mode; and a display displaying an image resulting from image processing by the image processor. When the image processing device is in the control mode, the image processor: specifies a specific video frame image from among a plurality of video frame images of a video constituted of a plurality of video frame images each including an image of a subject of the image processing, the specific video frame image being a video frame image in which the image of the subject is suitable; outputs the specific video frame image as a still image, as a result of the image processing; and receives control related to the image processing from a user, and when the image processing device is in the view mode, the image processor: performs the image processing with respect to the image of the subject in subsequent video frame images when the control has been received via the image of the subject in the specific video frame image; and presents a result of the image processing for the user to view.

Another aspect of the present disclosure is a program in an image processing system performing image processing with respect to a video input thereto and displaying a result of the image processing. The program causes a processor to execute the image processing including: determining whether an operation mode of the system is a control mode or a view mode, the system performing still image display in the control mode and performing video display in the view mode; and performing processing in accordance with the operation mode. When the system is in the control mode, the processing in accordance with the operation mode includes: specifying a specific video frame image from among a plurality of video frame images of a video constituted of a plurality of video frame images each including an image of a subject of the image processing, the specific video frame image being a video frame image in which the image of the subject is suitable; displaying the specific video frame image as a still image; and receiving control related to the image processing from a user, via the image of the subject in the specific video frame image, and when the system is in the view mode, the processing in accordance with the operation mode includes: performing the image processing with respect to each video frame image that is input, one video frame image at a time; and displaying the result of the image processing for the user to view.

Such aspects of the present disclosure achieve selecting a suitable image as an image for receiving on-screen control. In particular, the selected image is a still image including a suitable image of the subject of image processing.

(2) In the image processing method described in (1) above, the system may include a frame memory configured to store a processing-target video frame image, and may perform the processing in accordance with the operation mode with respect to the processing-target video frame image, which is a video frame image currently stored in the frame memory, when the system is in the view mode, the processing-target video frame image may be updated each time a new video frame image is input, by overwriting a video frame image currently stored in the frame memory with the new video frame image, and when the system is in the control mode, once the specific video frame image is specified and stored to the frame memory as the processing-target video frame image, the processing-target video frame image may not be updated until the operation mode switches to the view mode from the control mode.

This results in the frame memory storing only the image for receiving on-screen control, instead of storing unnecessary frame images as well.

(3) In the image processing method described in (2) above, when the system is in the control mode, the processing in accordance with the operation mode further may include: detecting characteristic coordinates in the one video frame image; and performing examination of a position indicated by the characteristic coordinates, wherein the determination of whether the image of the subject in the one video frame image is suitable is performed based on a result of the examination.

This achieves determining with certainty whether or not the subject appears in a frame image in a suitable manner.

(4) In the image processing method described in (3) above, the subject may be a face of a person, the characteristic coordinates detected in the one video frame image may be characteristic coordinates of an eye, and the examination may include examining whether the eye is open or closed based on positions of the characteristic coordinates of the eye, wherein when the eye is open, the one video frame image is specified as the specific video frame image and remains stored in the frame memory, and when the eye is closed, the frame memory is updated by using a video frame image following the one video frame image.

This prevents an image in which a person's eye is closed from being specified as the image for receiving on-screen control.

(5) In the image processing method described in (3) above, the subject may be a face of a person, the characteristic coordinates detected in the one video frame image may indicate a direction in which the face is facing, and the examination includes examining whether or not the face is facing forward based on the direction, wherein when the face is facing forward, the one video frame image is specified as the specific video frame image and remains stored in the frame memory, and when the face is not facing forward, the frame memory is updated by using a video frame image following the one video frame image.

This prevents an image in which a person is not facing forward from being specified as the image for receiving on-screen control.

(6) In the image processing method described in (1) above, the processing in accordance with the operation mode, when the system is in the control mode, may include detecting characteristic coordinates in the specific video frame image, and the processing in accordance with the operation mode, when the system is in the view mode, may include make-up processing of applying virtual make-up with respect to a part of the subject, in each video frame image that is input, that is related to the characteristic coordinates, and displaying the each video frame image with the virtual-make up applied.

This achieves performing make-up processing by using characteristic coordinates in the image for receiving on-screen control.

(7) In the image processing method described in (6) above, the control related to the image processing, performed by the user, may include selecting a sample color, and the make-up processing may include mapping, with respect to a color range of the sample color, values of a plurality of pixels composing the part of the subject in each video frame image that is input.

This enables the user to perform make-up processing by providing only simple instructions, when an application area of a virtual lip-stick, a virtual eye shadow, etc., is clearly specified based on characteristic coordinates.

(8) In the image processing method described in (6) above, the control related to the image processing, performed by the user, may include selecting a sample color and performing finger drawing control with respect to the image of the subject in the specific video frame image, and the make-up processing may include mapping, with respect to the part of the subject in each video frame image that is input, a drawing pattern that has a shape pertaining to the finger drawing control and that is composed of pixels of the sample color.

This enables the user to perform make-up processing even when applying a virtual blusher, etc. with respect to a complicated area.

(9) In the image processing method described in (6) above, the control related to the image processing, performed by the user, may include performing hand drawing control with respect to the part of the subject in the specific video frame image, the characteristic coordinates may define a shape of an outline of the part of the subject in the specific video frame image, and the make-up processing may include searching for corresponding points in the specific video frame image and each video frame image that is input so as to link the characteristic coordinates detected in the specific video frame image with corresponding characteristic coordinates in the each video frame image, and mapping a hand-drawn image pertaining to the hard drawing control with respect to a part of the subject, in the each video frame image, that has been linked with the part of the subject in the specific video frame image through the search for corresponding points.

This enables the user to perform appropriate make-up processing with respect to face parts.

(10) In the image processing method described in (6) above, the processing in accordance with the operation mode, when the system is in the control mode, may further comprise storing the characteristic coordinates, and in the view mode, the part of the subject may be located at a position of the subject, in each video frame image that is input, related to the stored characteristic coordinates.

This achieves, in the control mode, using characteristic coordinates originally used to determine whether or not the subject is appearing in a suitable manner also in make-up processing, which reduces the amount of computation that needs to be performed.

(11) In the image processing method described in (3) above, the processing in accordance with the operation mode, when the system is in the control mode, may include storing characteristic points detected within a predetermined period, and performing characteristic coordinate filtering with respect to the stored characteristic coordinates, the characteristic coordinate filtering comprising filtering corresponding ones of the stored characteristic coordinates, the processing in accordance with the operation mode, when the system is in the view mode, may include performing characteristic coordinate detection of detecting characteristic coordinates in each video frame image that is input, and when the system is in the control mode, the examination may be performed by using characteristic coordinates yielded as a result of the characteristic coordinate filtering, in place of the characteristic coordinates yielded as a result of the detection of characteristic coordinate.

This achieves, even when there is a temporary drop in the accuracy of detection of characteristic coordinates used to determine whether or not the subject is appearing in a suitable manner, appropriately detecting the characteristic coordinates.

(12) In the image processing method described in (11) above, the filtering in the characteristic coordinate filtering may be averaging corresponding ones of the stored characteristic coordinates.

This achieves filtering characteristic coordinates by performing only simple computation.

(13) In the image processing method described in (11) above, the characteristic coordinate filtering may further include, after performing the filtering, comparing the stored characteristic coordinates and characteristic coordinates yielded as a result of the filtering, and performing the filtering once again after excluding ones of the stored characteristic coordinates differing from corresponding ones of the characteristic coordinates yielded as a result of the filtering by a value greater than a predetermined threshold value.

This achieves excluding characteristic coordinates of low detection accuracy and performing filtering with high accuracy.

(14) The image processing method described in (11) above may further include receiving a setting of the operation mode from the user, and the processing in accordance with the operation mode, when the system is in the view mode, may include: performing make-up processing with respect to a part of the subject, in each video frame image that is input, that is related to characteristic coordinates yielded as a result of the characteristic coordinate filtering; and displaying the each video frame image with the make-up processing applied, the control related to the image processing, performed by the user, may include selecting a sample color, and the make-up processing may include mapping, with respect to a color range of the sample color, values of a plurality of pixels composing the part of the subject.

This reduces the risk of make-up processing being performed with respect to an inappropriate position, by using filtered characteristic coordinates.

(15) The image processing method described in (1) above may further include receiving a setting of the operation mode from the user.

This enables the user to change the operation mode as necessary.

(16) In the image processing method described in (15) above, the system may include a touch panel, and the user may perform the setting of the operation mode by performing touch control with respect to a specific area of the touch panel.

This allows the user to change the operation mode by only providing a simple instruction.

(17) The image processing method described in (16) above may further include when the user performs the setting of the operation mode, providing a notification that setting has been accepted.

This achieves notifying the user that the operation mode of the system has changed.

(18) In the image processing method described in (17) above, the notification may be provided by displaying the operation mode that has been set by the user.

This enables the user to check the operation mode of the system visually.

(19) In the image processing method described in (17) above, the notification may be provided by output of sound.

This enables the user to check the operation mode of the system without concentrating his/her attention on the screen.

INDUSTRIAL APPLICABILITY

The image processing method pertaining to the present disclosure is useful in a make-up simulator terminal or the like, for achieving selecting a suitable image as an image for receiving on-screen control related to make-up simulation. Further, the image processing method pertaining to the present disclosure is also applicable, for example, to a digital sign display having a make-up simulation function.

In addition, the image processing method pertaining to the present disclosure is useful not only for make-up simulation but also for simulation related to the appearance of people and objects, such as dress-up simulation.

REFERENCE SIGNS LIST

1 Make-up simulator
2 Camera
11 Characteristic coordinate detector
12 Frame memory
13 Control unit
14 Image processor
3 Touch panel monitor

The invention claimed is:
1. An image processing method usable in an image processing system, the image processing system performing image processing with respect to a video input thereto and displaying a result of the image processing, the image processing method comprising:
determining whether an operation mode of the system is a control mode or a view mode, the system performing still image display in the control mode and performing video display in the view mode; and performing processing in accordance with the operation mode, wherein when the system is in the control mode, the processing in accordance with the operation mode comprises:

each time a video frame image is input, performing frame determination processing of determining whether the video frame image includes a face image of a subject of the image processing; and when the frame determination processing determines that the video frame image includes a face image of the subject, performing reception processing of setting the one video frame image as an image to be displayed for receiving control related to the image processing, displaying the one video frame image as a still image, receiving a specification of at least one area of the one video frame image displayed as a still image and receiving user control for specifying operations of the image processing to be performed on the subject via the at least one area of the one video frame image displayed as a still image, and causing the system to refrain from performing the frame determination processing with respect to any video frame image subsequent to the one video frame image, and when the system transitions to the view mode from the control mode, the processing in accordance with the operation mode comprises:

each time a video frame image is input, performing the image processing with respect to an image of the subject in the video frame image based on the specified operations of the image processing; and displaying the result of the image processing for the user to view.

2. The image processing method of claim 1, wherein the system comprises a frame memory configured to store a processing-target video frame image, and performs the processing in accordance with the operation mode with respect to the processing-target video frame image, which is a video frame image currently stored in the frame memory, when the system is in the view mode, the processing-target video frame image is updated each time a new video frame image is input, by overwriting a video frame image currently stored in the frame memory with the new video frame image, and when the system is in the control mode, once the one video frame image is determined and stored to the frame memory as the processing-target video frame image, the processing-target video frame image is not updated until the operation mode switches to the view mode from the control mode.

3. The image processing method of claim 2, wherein the frame determination processing further comprises:

each time a video frame image is input, detecting characteristic coordinates in the video frame image; and performing examination of a position indicated by the characteristic coordinates, wherein the determination of whether the image of the subject in the one video frame image is suitable is performed based on a result of the examination.

4. The image processing method of claim 3, wherein the subject is a face of a person, the characteristic coordinates detected in the video frame image are characteristic coordinates of an eye, and the examination comprises examining whether the eye is open or closed based on positions of the characteristic coordinates of the eye, wherein when the eye is open, the video frame image is determined as the one video frame image and remains stored in the frame memory, and when the eye is closed, the frame memory is updated by using a video frame image following the video frame image.

5. The image processing method of claim 3, wherein the subject is a face of a person, the characteristic coordinates detected in the video frame image indicate a direction in which the face is facing, and the examination comprises examining whether or not the face is facing forward based on the direction, wherein when the face is facing forward, the video frame image is determined as the one video frame image and remains stored in the frame memory, and when the face is not facing forward, the frame memory is updated by using a video frame image following the video frame image.

6. The image processing method of claim 3, wherein the processing in accordance with the operation mode, when the system is in the control mode, comprises storing characteristic points detected within a predetermined period, and performing characteristic coordinate filtering with respect to the stored characteristic coordinates, the characteristic coordinate filtering comprising filtering corresponding ones of the stored characteristic coordinates, the processing in accordance with the operation mode, when the system is in the view mode, comprises performing characteristic coordinate detection of detecting characteristic coordinates in each video frame image that is input, and when the system is in the control mode, the examination is performed by using characteristic coordinates yielded as a result of the characteristic coordinate filtering, in place of the characteristic coordinates yielded as a result of the detection of characteristic coordinate.

7. The image processing method of claim 6, the filtering in the characteristic coordinate filtering comprises averaging corresponding ones of the stored characteristic coordinates.

8. The image processing method of claim 6, wherein the characteristic coordinate filtering further comprises, after performing the filtering, comparing the stored characteristic coordinates and characteristic coordinates yielded as a result of the filtering, and performing the filtering once again after excluding ones of the stored characteristic coordinates differing from corresponding ones of the characteristic coordinates yielded as a result of the filtering by a value greater than a predetermined threshold value.

9. The image processing method of claim 6 further comprising:

receiving a setting of the operation mode from the user, wherein the processing in accordance with the operation mode, when the system is in the view mode, comprises:

performing make-up processing with respect to a part of the subject, in each video frame image that is input, that is related to characteristic coordinates yielded as a result of the characteristic coordinate filtering; and displaying the each video frame image with the make-up processing applied, the user control for specifying the contents of the image processing includes selecting a sample color, and the make-up processing comprises mapping, with respect to a color range of the sample color, values of a plurality of pixels composing the part of the subject.

10. The image processing method of claim 1, wherein the processing in accordance with the operation mode, when the system is in the control mode, comprises detecting characteristic coordinates in the one video frame image, and the processing in accordance with the operation mode, when the system is in the view mode, comprises make-up processing of applying virtual make-up with respect to a part of the subject, in each video frame image that is input, that is related to the characteristic coordinates, and displaying the each video frame image with the virtual-make up applied.

11. The image processing method of claim 10, wherein the user control for specifying the contents the image processing includes selecting a sample color, and the make-up processing comprises mapping, with respect to a color range of the sample color, values of a plurality of pixels composing the part of the subject in each video frame image that is input.

12. The image processing method of claim 10, wherein the user control for specifying the contents of the image processing includes selecting a sample color and performing finger drawing control with respect to the image of the subject in the one video frame image, and the make-up processing comprises mapping, with respect to the part of the subject in each video frame image that is input, a drawing pattern that has a shape pertaining to the finger drawing control and that is composed of pixels of the sample color.

13. The image processing method of claim 10, wherein the user control for specifying the contents of the image processing includes performing hand drawing control with respect to the part of the subject in the one video frame image, the characteristic coordinates define a shape of an outline of the part of the subject in the one video frame image, and the make-up processing comprises searching for corresponding points in the one video frame image and each video frame image that is input so as to link the characteristic coordinates detected in the one video frame image with corresponding characteristic coordinates in the each video frame image, and mapping a hand-drawn image pertaining to the hard drawing control with respect to a part of the subject, in the each video frame image, that has been linked with the part of the subject in the one video frame image through the search for corresponding points.

14. The image processing method of claim 10, wherein the processing in accordance with the operation mode, when the system is in the control mode, further comprises storing the characteristic coordinates, wherein in the view mode, the part of the subject is located at a position of the subject, in each video frame image that is input, related to the stored characteristic coordinates.

15. The image processing method of claim 1 further comprising receiving a setting of the operation mode from the user.

16. The image processing method of claim 15, wherein the system comprises a touch panel, and the user performs the setting of the operation mode by performing touch control with respect to a specific area of the touch panel.

17. The image processing method of claim 16 further comprising when the user performs the setting of the operation mode, providing a notification that setting has been accepted.

18. The image processing method of claim 17, wherein the notification is provided by displaying the operation mode that has been set by the user.

19. The image processing method of claim 17, wherein the notification is provided by output of sound.

20. An image processing device performing image processing with respect to a video input thereto and displaying a result of the image processing, the image processing device comprising:

an operation mode determiner determining whether an operation mode of the image processing device is a control mode or a view mode, the image processing device performing still image display in the control mode and performing video display in the view mode;

an image processor performing image processing in accordance with the operation mode; and a display displaying an image resulting from the image processing by the image processor, wherein when the image processing device is in the control mode, the image processor:

each time a video frame image is input, performs frame determination processing of determining whether the video frame image includes a face image of a subject of the image processing; and when the frame determination processing determines that the video frame image includes a face image of the subject, performs reception processing of setting the one video frame image as an image to be displayed for receiving control related to the image processing, displays the one video frame image as a still image, receives a specification of at least one area of the one video frame image displayed as a still image and receives user control for specifying operations of the image processing to be performed on the subject via the at least one area of the one video frame image displayed as a still image, and causes the system to refrain from performing the frame determination processing with respect to any video frame image subsequent to the one video frame image, and when the image processing device transitions to the view mode from the control mode, the image processor:

each time a video frame is input, performs the image processing with respect to an image of the subject in the video frame image based on the specified operations of the image processing; and presents a result of the image processing for the user to view.

21. A non-transitory computer-readable recording medium having recorded thereon a program usable in an image processing system performing image processing with respect to a video input thereto and displaying a result of the image processing, the program causing a processor to execute the image processing comprising:

determining whether an operation mode of the system is a control mode or a view mode, the system performing still image display in the control mode and performing video display in the view mode; and performing processing in accordance with the operation mode, wherein
when the system is in the control mode, the processing in accordance with the operation mode comprises:
 each time a video frame image is input, performing frame determination processing of determining whether the video frame image includes a face image of a subject of the image processing; and
 when the frame determination processing determines that the video frame image includes a face image of the subject,
  performing reception processing of setting the one video frame image as an image to be displayed for receiving control related to the image processing, displaying the one video frame image as a still image, receiving a specification of at least one area of the one video frame image displayed as a still image and receiving user control for specifying operations of the image processing to be performed on the subject via the at least one area of the one video frame image displayed as a still image, and causing the system to refrain from performing the frame determination processing with respect to any video frame image subsequent to the one video frame image, and
when the system transitions to the view mode from the control mode, the processing in accordance with the operation mode comprises:
 each time a video frame image is input, performing the image processing with respect to an image of the subject in the video frame image based on the specified operations of the image processing; and
 displaying the result of the image processing for the user to view.

* * * * *